(12) United States Patent
Huang et al.

(10) Patent No.: US 12,130,371 B2
(45) Date of Patent: Oct. 29, 2024

(54) SYSTEMS AND METHODS FOR POSITIONING DEVICES

(71) Applicant: SHENZHEN HANYANG TECHNOLOGY CO., LTD., Guangdong (CN)

(72) Inventors: Yang Huang, Shenzhen (CN); Taotao Zhu, Shenzhen (CN); Anyang Tian, Shenzhen (CN); Qingqing Qiao, Shenzhen (CN)

(73) Assignee: Shenzhen Hanyang Technology Co., Ltd., Shenzhen (CN)

( * ) Notice: Subject to any disclaimer, the term of this patent is extended or adjusted under 35 U.S.C. 154(b) by 631 days.

(21) Appl. No.: 17/305,817

(22) Filed: Jul. 15, 2021

(65) Prior Publication Data
US 2021/0341566 A1 Nov. 4, 2021

Related U.S. Application Data

(63) Continuation-in-part of application No. PCT/CN2019/091797, filed on Jun. 19, 2019.

(30) Foreign Application Priority Data

Jun. 13, 2019 (CN) .......................... 201910511007.2

(51) Int. Cl.
*G01S 5/02* (2010.01)
*G01C 17/00* (2006.01)
(Continued)

(52) U.S. Cl.
CPC ............ *G01S 5/0257* (2013.01); *G01C 17/00* (2013.01); *G01C 22/00* (2013.01); *G01S 5/10* (2013.01); *G06V 20/10* (2022.01)

(58) Field of Classification Search
CPC ......... G01S 5/0257; G01S 5/10; G01C 17/00; G01C 22/00; G06V 20/10
See application file for complete search history.

(56) References Cited

U.S. PATENT DOCUMENTS

| | | | |
|---|---|---|---|
| 10,302,737 B2 * | 5/2019 | Hehn | .................... H04W 84/18 |
| 2003/0071733 A1 * | 4/2003 | Hall | ........................ G01S 5/10 |
| | | | 340/4.33 |

(Continued)

FOREIGN PATENT DOCUMENTS

| | | |
|---|---|---|
| CN | 103410512 A | 11/2013 |
| CN | 103487050 A | 1/2014 |

(Continued)

OTHER PUBLICATIONS

International Search Report in PCT/CN2019/091797 mailed on Mar. 2, 2020, 6 pages.

(Continued)

*Primary Examiner* — Navid Z. Mehdizadeh
*Assistant Examiner* — Caitlin R McCleary
(74) *Attorney, Agent, or Firm* — Stinson LLP

(57) ABSTRACT

The present disclosure discloses a method for positioning a device. The method includes obtaining a location parameter associated with the device. The location parameter includes at least one of first location information or speed information. The method also includes obtaining an orientation parameter associated with the device. The orientation parameter includes at least one of first orientation information or angle velocity information. Further, the method includes determining target location information of the device by performing a first fusion calculation based on the location parameter and determining target orientation information of the device by performing a second fusion calculation based on the orientation parameter.

19 Claims, 22 Drawing Sheets

(51) Int. Cl.
*G01C 22/00* (2006.01)
*G01S 5/10* (2006.01)
*G06V 20/10* (2022.01)

(56) References Cited

U.S. PATENT DOCUMENTS

| | | | |
|---|---|---|---|
| 2015/0354980 A1* | 12/2015 | Wahdan | G01C 17/02 |
| | | | 324/202 |
| 2018/0356492 A1 | 12/2018 | Hamilton | |
| 2019/0003137 A1* | 1/2019 | Gao | G01S 15/93 |

FOREIGN PATENT DOCUMENTS

| CN | 105446350 A | 3/2016 |
|---|---|---|
| CN | 106052684 A | 10/2016 |
| CN | 106352869 A | 1/2017 |
| CN | 106643694 A | 5/2017 |
| CN | 107044103 A | 8/2017 |
| CN | 107190696 A | 9/2017 |
| CN | 107291077 A | 10/2017 |
| CN | 107544483 A | 1/2018 |
| CN | 207113893 U | 3/2018 |
| CN | 107974996 A | 5/2018 |
| CN | 109040961 A | 12/2018 |
| JP | 4825159 B2 | 9/2011 |
| WO | 2018142198 A1 | 8/2018 |

OTHER PUBLICATIONS

Written Opinion in PCT/CN2019/091797 mailed on Mar. 2, 2020, 6 pages.
First Ofice Action in Chinese Application No. 201910511007.2 mailed on Nov. 2, 2020, 13 pages.
The Second Office Action in Chinese Application No. 201910511007.2 mailed on Apr. 6, 2021, 14 pages.

* cited by examiner

SYSTEMS AND METHODS FOR POSITIONING DEVICES

CROSS-REFERENCE TO RELATED APPLICATIONS

This application claims priority to International Application No. PCT/CN2019/091797 filed on Jun. 19, 2019, which claims priority to Chinese Application No. 201910511007.2 filed on Jun. 13, 2019, the entire contents of each of which are hereby incorporated by reference.

TECHNICAL FIELD

The present disclosure relates to a computer field, and in particular, to systems and methods for positioning a device.

BACKGROUND

Currently, there are many positioning manners for movable devices (e.g., a robot, an unmanned aircraft, an unmanned vehicle). For example, a coordinate of a device is determined based on single ultrasonic sensor ranging information and trajectory information thereof. In some cases, an orientation of the vehicle changes during a movement of the device. It is also necessary to determine the orientation of the device. Therefore, it is desirable to provide systems and methods for determining a location (e.g., a coordinate) and/or an orientation of a device.

SUMMARY

According to some embodiments of the present disclosure, a method for positioning a device is provided. The method includes: obtaining a location parameter associated with the device, wherein the location parameter includes at least one of first location information or speed information; obtaining an orientation parameter associated with the device, wherein the orientation parameter includes at least one of first orientation information or angle velocity information; determining target location information of the device by performing a first fusion calculation based on the location parameter; and determining target orientation information of the device by performing a second fusion calculation based on the orientation parameter.

In some embodiments, the performing the first fusion calculation based on the location parameter includes: determining second location information based on the first location information; determining an odometry (ODOM) increment based on the speed information; and determining the target location information of the device based on the second location information and the ODOM increment.

In some embodiments, the determining the second location information based on the first location information includes: determining the second location information by performing a straight line fitting of the first location information using a technique of least squares.

In some embodiments, the device performs a uniform linear motion from a first time point to a second time point and a non-uniform linear motion from the second time point to a third time point. The determining the target location information and the target orientation information includes: determining target location information, for the uniform linear motion of the device, by performing a straight line fitting of the first location information or the speed information using a technique of least squares; determining target orientation information, for the uniform linear motion of the device, by performing a straight line fitting of the first orientation information or the angle velocity information using the technique of least squares; and determining target location information and target orientation information, for the non-uniform linear motion of the device, based at least on target location information and target orientation information corresponding to the second time point determined by the straight line fitting.

In some embodiments, the performing the second fusion calculation based on the orientation parameter includes: determining second orientation information based on the first orientation information; and determining the target orientation information of the device based on the second orientation information and the angle velocity information.

In some embodiments, the determining the second orientation information based on the first orientation information includes: obtaining compass data by rotating the device by a circle; and determining the second orientation information by correcting the first orientation information based on the compass data.

In some embodiments, the first location information is obtained by an ultra-wideband (UWB) positioning system. The UWB positioning system includes at least one of a base station, a first label, a second label, or a third label.

In some embodiments, the base station is disposed in the device.

In some embodiments, the speed information includes at least one of speeds of a left wheel and a right wheel of the device, a speed of the device, tick values of rotary encoders of two wheels of the device, a tick value of the device by moving one meter, or a distance between the left wheel and the right wheel of the device.

In some embodiments, at least one of the first label, the second label, or the third label is set in different lines.

In some embodiments, the first location information includes a position of the first label in a UWB coordinate system.

In some embodiments, the first fusion calculation includes: determining the second location information by correcting the first location information obtained by a UWB positioning system; determining the ODOM increment based on the speed information; and determining the target location information of the device by performing the first fusion calculation based on the second location information and the ODOM increment.

In some embodiments, the first location information obtained by the UWB positioning system is corrected according to a formula:

$$r_{modify} = (r_{uwb\_raw} - b_{uwb})/k_{uwb}$$

where $r_{modify}$ represents the second location information, $r_{uwb\_raw}$ represents the first location information obtained by the UWB positioning system, $k_{uwb}$ represents a slope of a straight line obtained by performing the straight line fitting of the first location information using the technique of least squares, and $b_{uwb}$ represents an intercept obtained by performing the straight line fitting of the first location information using the technique of least squares.

In some embodiments, the ODOM increment is determined based on the speed information according to formulas:

$$d_{device\_odom} = \frac{(n_{tick\_left} + n_{tick\_right})/2}{N_{tick\_1m}}$$

$$\gamma_{device} = \frac{(n_{tick\_right} - n_{tick\_left})/l_{width}}{N_{tick\_1m}}$$

$$x_{device\_odom} = d_{device\_odom} \cos\gamma_{device}$$

$$y_{device\_odom} = d_{device\_odom} \sin\gamma_{device}$$

where $d_{device\_odom}$ represents a distance that was traveled by the device, $n_{tick\_left}$ represents a tick value rotated by a left wheel encoder of the device, $n_{tick\_right}$ represents a tick value rotated by a right wheel encoder of the device, $N_{tick\_1m}$ represents a tick value rotated by the left or right wheel encoder of the device by moving one meter, $l_{width}$ represents a distance between the left wheel and the right wheel of the device, $x_{device\_odom}$ represents an ODOM increment in the $x_{device}$-axis, $y_{device\_odom}$ represents an ODOM increment in the $y_{device}$-axis, and $\gamma_{device}$ represents a rotation angle of the device.

In some embodiments, the target location information of the device is determined by performing the first fusion calculation based on the second location information and the ODOM increment according to formulas:

$$dx_{device\_odom} = dT \times (v_{device\_odom\_x\_i-1} + v_{device\_odom\_x\_i})/2$$

$$dy_{device\_odom} = dT \times (v_{device\_odom\_y\_i-1} + v_{device\_odom\_y\_i})/2$$

$$\begin{bmatrix} dx_{UWB\_odom} \\ dy_{UWB\_odom} \end{bmatrix} = \begin{bmatrix} \cos\varphi & -\sin\varphi \\ \sin\varphi & \cos\varphi \end{bmatrix} \begin{bmatrix} dx_{device\_odom} \\ dy_{device\_odom} \end{bmatrix}$$

$$x_{UWB\_odom\_i} = x_{UWB\_odom\_i-1} + dx_{UWB\_odom}$$

$$y_{UWB\_odom\_i} = y_{UWB\_odom\_i-1} + dy_{UWB\_odom}$$

$$\begin{bmatrix} x_{UWB\_i} \\ y_{UWB\_i} \end{bmatrix} = K_i \times \left( \begin{bmatrix} x_{UWB\_TOF\_i} \\ y_{UWB\_TOF\_i} \end{bmatrix} - \begin{bmatrix} x_{UWB\_odom\_i} \\ y_{UWB\_odom\_i} \end{bmatrix} \right) + \begin{bmatrix} x_{UWB\_i-1} \\ y_{UWB\_i-1} \end{bmatrix}$$

$$K_i = \overline{P}_i/(\overline{P}_i + R)$$

$$\overline{P}_i = P_i + Q$$

$$P_i = (I - K_{i-1})\overline{P}_{i-1}$$

where (i−1) represents a first time point, i represents a second time point, dT represents a time interval of two first fusion calculations, $dx_{device\_odom}$ represents an ODOM increment along with an $x_{device}$-axis during dT, $dy_{device\_odom}$ represent an ODOM increment along with a $y_{device}$-axis during dT, φ represents an angle between an $x_{device} o_{device} y_{device}$ coordinate system and the UWB coordinate system, $dx_{UWB\_odom}$ represents an ODOM increment along with an $x_{UWB}$-axis during dT, $dy_{UWB\_odom}$ represents an ODOM increment along with a $y_{UWB}$-axis during dT, $x_{UWB\_odom\_i}$ represent an ODOM accumulated value along with the $x_{UWB}$-axis at the time point i, $y_{UWB\_odom\_i}$ represents an ODOM accumulated value along with the $y_{UWB}$-axis at the time point i, $$\begin{bmatrix} x_{UWB\_TOF\_i} \\ y_{UWB\_TOF\_i} \end{bmatrix}$$

represents a coordinate provided by the UWB positioning system at the time point i under a UWB coordinate system, $$\begin{bmatrix} x_{UWB\_i} \\ y_{UWB\_i} \end{bmatrix}$$

represents target location information of the device at the time point i under the UWB coordinate system, R represents a variance matrix of noise of the first location information obtained by the UWB positioning system, Q represents a variance matrix of noise of the ODOM increment, I represents a unit matrix, $K_i$ represents a Kalman filter coefficient matrix, P represents a covariance matrix of errors, $\overline{P}$ represents a sum of the covariance matrix of errors at the time point i and the variance matrix of noise of the ODOM increment.

In some embodiments, at least one of the first label, the second label, or the third label of the UWB positioning system is used to construct a map coordinate system.

In some embodiments, the target orientation information includes an angle between a direction of a head of the device and the $x_{UWB}$-axis of the UWB coordinate system.

In some embodiments, the device includes an automatic device configured to sweep snow.

According to some embodiments of the present disclosure, a system for positioning a device is provided. The system includes: at least one storage device including a set of instructions; at least one processor in communication with the at least one storage device; wherein when executing the set of instructions, the at least one processor is configured to cause the system to: obtain a location parameter associated with a device, wherein the location parameter includes at least one of first location information or speed information; obtain an orientation parameter associated with the device, wherein the orientation parameter includes at least one of first orientation information or angle velocity information; determine target location information of the device by performing a first fusion calculation based on the location parameter; and determine target orientation information of the device by performing a second fusion calculation based on the orientation parameter.

According to some embodiments of the present disclosure, a non-transitory computer-readable storage medium is provided. The non-transitory computer-readable storage medium includes instructions that, when executed by at least one processor, direct the at least processor to perform a method for positioning a device. The method includes: obtaining a location parameter associated with the device, wherein the location parameter includes at least one of first location information or speed information; obtaining an orientation parameter associated with the device, wherein the orientation parameter includes at least one of first orientation information or angle velocity information; determining target location information of the device by performing a first fusion calculation based on the location parameter; and determining target orientation information of the device by performing a second fusion calculation based on the orientation parameter.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting schematic embodiments, in which like reference numerals represent similar structures throughout the several views of the drawings, and wherein.

DETAILED DESCRIPTION

Figure 1:
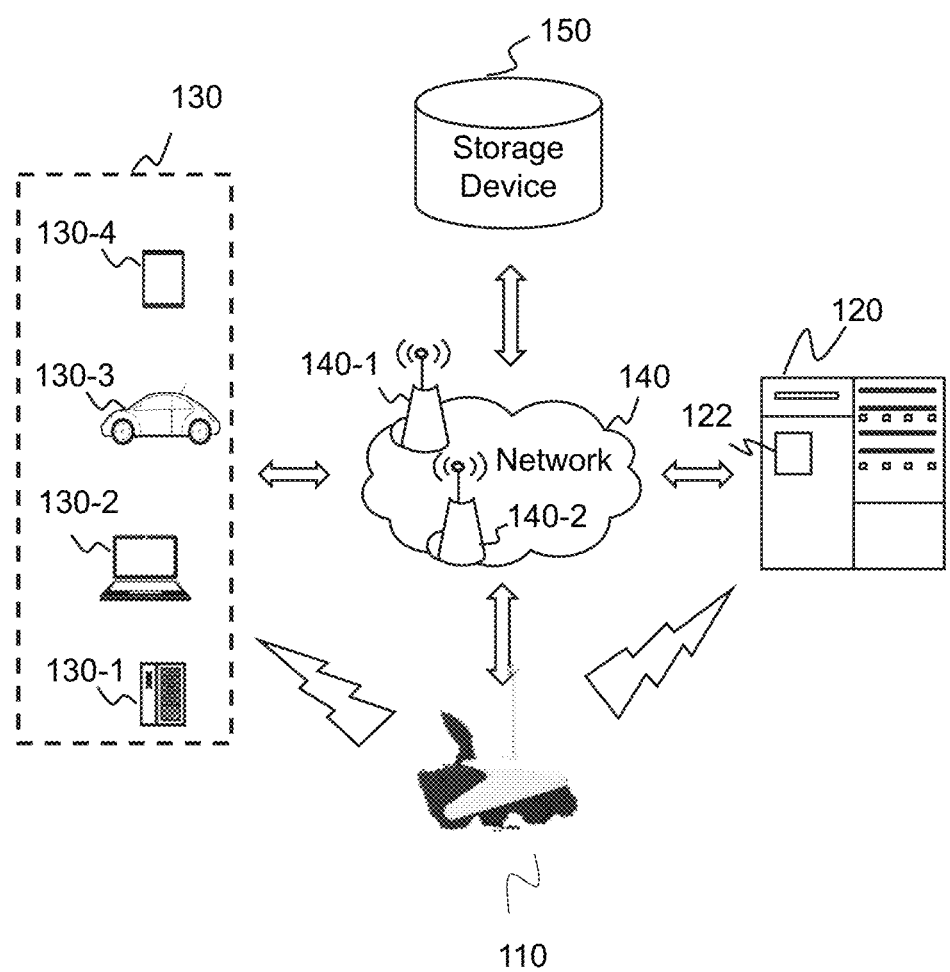
FIG. 1 is a schematic diagram illustrating an exemplary positioning system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the terms "system," "unit," "module," and/or "block" used herein are one method to distinguish different components, elements, parts, sections or assemblies of different levels in ascending order. However, the terms may be displaced by another expression if they achieve the same purpose.

The modules (or units, blocks, units) described in the present disclosure may be implemented as software and/or hardware modules and may be stored in any type of non-transitory computer-readable medium or other storage devices. In some embodiments, a software module may be compiled and linked into an executable program. It will be appreciated that software modules can be callable from other modules or from themselves, and/or can be invoked in response to detected events or interrupts. Software modules configured for execution on computing devices can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in a firmware, such as an EPROM. It will be further appreciated that hardware modules (e.g., circuits) can be included of connected or coupled logic units, such as gates and flip-flops, and/or can be included of programmable units, such as programmable gate arrays or processors. The modules or computing device functionality described herein are preferably implemented as hardware modules, but can be software modules as well. In general, the modules described herein refer to logical modules that can be combined with other modules or divided into units despite their physical organization or storage.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

It will be understood that, although the terms "first," "second," "third," etc., may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present disclosure.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

According to one aspect of the present disclosure, a system for positioning a device (e.g., a device for sweeping snow) is provided. The system obtains a location parameter associated with the device (e.g., first location information, speed information) and an orientation parameter associated with the device (e.g., first orientation information, angle velocity information). The system determines target location information (e.g., a coordinate) of the device by performing a first fusion calculation based on the location parameter. The system also determines target orientation information (e.g., an angle of a direction of a front portion of the device relative to a reference direction) by performing a second fusion calculation based on the orientation parameter. A positioning accuracy of the device is improved by performing the first fusion calculation and/or the second fusion based on different types of information (e.g., the location parameter, the orientation parameter).

Figure 2:
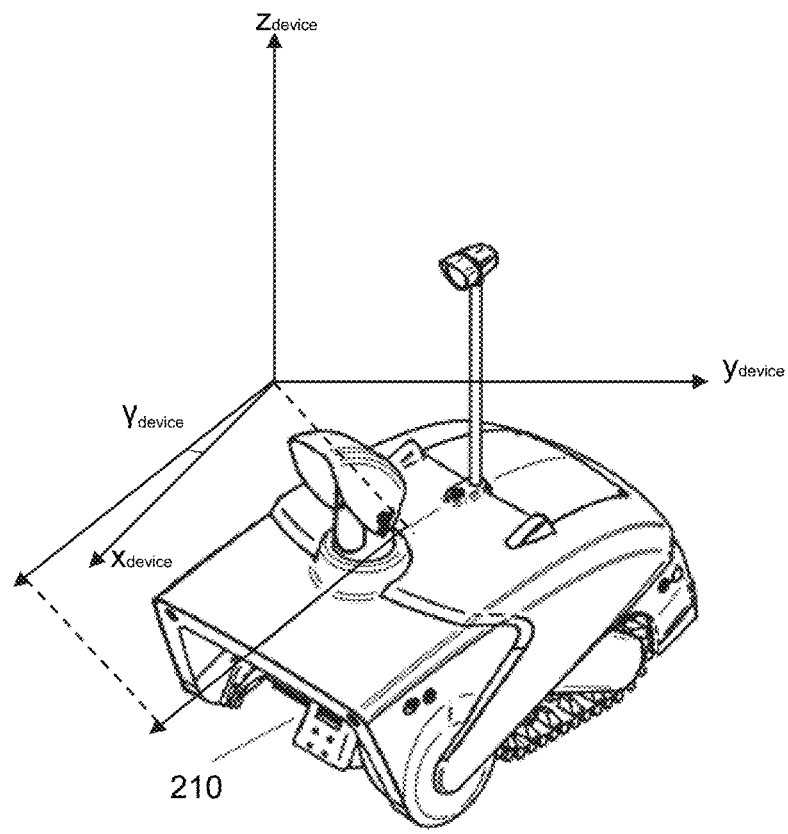
FIG. 2 is a schematic diagram illustrating an exemplary device according to some embodiments of the present disclosure.

FIG. 1 is a schematic diagram illustrating an exemplary positioning system according to some embodiments of the present disclosure. FIG. 2 is a schematic diagram illustrating an exemplary device according to some embodiments of the present disclosure. In some embodiments, the positioning system 100 includes a device 110, a server 120, one or more terminals 130, a network 140, and a storage device 150. The positioning system 100 is configured to position (e.g., a location, an orientation) the device 110.

In some embodiments, the device 110 is configured to perform different functions in different application scenarios, e.g., environmental cleaning, goods transportation, guidance, etc. Merely by way of example, the device 110 is configured to sweep snow, sweep the floor, remove dust, mop the floor, mow the lawn, paint, etc. For illustration purposes, the present disclosure takes the device 110 for sweeping the snow as an example, which may be not intended to limit the scope of the present disclosure.

In some embodiments, the device 110 transmits and/or receives wireless signals (e.g., a WiFi signal, a Bluetooth signal, a ZigBee signal, an active radio-frequency identification (RFID) signal). The device 110 includes a controller (e.g., a controller 320 in FIG. 3) and a communication module (e.g., a communication module 310 in FIG. 3) (e.g., WiFi, Bluetooth, ZigBee, active RFID, etc.). In some embodiments, the device 110 includes a location obtainment module (e.g., an ultra-wideband (UWB) positioning system, a rotary encoder (e.g., a left wheel encoder, a right wheel encoder), a global positioning system (GPS)) and an orientation obtainment module (e.g., a gyroscope, a compass (e.g., an electronic compass, a magnetometer)). In some embodiments, the device 110 is automatic, e.g., a robot, an unmanned aircraft, an unmanned vehicle, etc. In some embodiments, the device 110 is movable. More descriptions of a structure of the device 110 may be found elsewhere in the present disclosure, e.g., FIGS. 3-11 and/or the descriptions thereof.

In some embodiments, the positioning system 100 is configured to determine target location information (e.g., a coordinate) and/or target orientation information of the device 110 based on a location parameter and/or an orientation parameter obtained by the location obtainment module and/or the orientation obtainment module. The target orientation information includes an angle (e.g., angle $\gamma_{device}$ in FIG. 2) between a front portion (e.g., a head 210 in FIG. 2) of the device 110 and a reference direction (e.g., an $x_{device}$-axis of a map coordinate system, an $x_{UWB}$-axis of a UWB coordinate system). In some embodiments, the location parameter includes first location information obtained by the UWB positioning system, speed information obtained by the rotary encoder, etc. The orientation parameter includes first orientation information obtained by the compass, angle velocity information obtained by the gyroscope, etc. More descriptions of the target location information and/or the target orientation information may be found elsewhere in the present disclosure, e.g., FIGS. 14-22 and/or the descriptions thereof.

In some embodiments, the server 120 may be a single server or a server group. The server group may be centralized or distributed (e.g., the server 120 may be a distributed system). In some embodiments, the server 120 may be local or remote. For example, the server 120 may access information and/or data stored in the device 110, the terminal(s) 130, and/or the storage device 150 via the network 140. As another example, the server 120 may be directly connected to the device 110, the terminal(s) 130, and/or the storage device 150 to access stored information and/or data. In some embodiments, the server 120 may be implemented on a cloud platform or an onboard computer. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 120 may be implemented on a computing device 200 including one or more components illustrated in FIG. 2 of the present disclosure.

In some embodiments, the server 120 may include a processing device 122. The processing device 122 may process and/or obtain information and/or data associated with the device 110 to perform one or more functions described in the present disclosure. For example, the processing device 122 obtains the location parameter and/or the orientation parameter associated with the device 110. The processing device 122 determines the target location information and/or the target orientation information of the device 110 based on the location parameter and/or the orientation parameter. In some embodiments, the processing device 122 may include one or more processing engines (e.g., single-core processing engine(s) or multi-core processor(s)). Merely by way of example, the processing device 122 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

In some embodiments, the server 120 may be connected to the network 140 to communicate with one or more components (e.g., the device 110, the terminal(s) 130, the storage device 150) of the positioning system 100. In some embodiments, the server 120 may be directly connected to or communicate with one or more components (e.g., the device 110, the terminal(s) 130, the storage device 150) of the positioning system 100.

In some embodiments, the network 140 may facilitate exchange of information and/or data. In some embodiments, one or more components (e.g., the device 110, the server 120, the terminal(s) 130, the storage device 150) of the positioning system 100 may transmit information and/or data to other component(s) of the positioning system 100 via the network 140. For example, the device 110 transmits the location parameter and/or the orientation parameter associated with the device 110 to the processing device 120 via the network 140. In some embodiments, the network 140 may be any type of wired or wireless network, or combination thereof. Merely by way of example, the network 140 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 140 may include one or more network access points. For example, the network 140 may include wired or wireless network access points (e.g., a point 140-1, a point 140-2), through which one or more components of the positioning system 100 may be connected to the network 140 to exchange data and/or information.

The storage device 150 may store data and/or instructions. In some embodiments, the storage device 150 may store data obtained from the device 110, the server 120, the terminal(s) 130, an external storage device, etc. For example, the storage device 150 stores the location parameter and/or the orientation parameter associated with the device 110. As another example, the storage device 150 stores the target location information and/or the target orientation information of the device 110. In some embodiments, the storage device 150 may store data and/or instructions that the server 120 may execute or use to perform exemplary methods described in the present disclosure.

In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 140 to communicate with one or more components (e.g., the device 110, the server 120, the terminal(s) 130) of the positioning system 100. One or more components of the positioning system 100 may access the data or instructions stored in the storage device 150 via the network 140. In some embodiments, the storage device 150 may be directly connected to or communicate with one or more components (the device 110, the server 120, the terminal(s) 130) of the positioning system 100. In some embodiments, the storage device 150 may be part of the server 120. For example, the storage device 150 may be integrated into the server 120.

It should be noted that the positioning system 100 is merely provided for the purposes of illustration, and is not intended to limit the scope of the present disclosure. For persons having ordinary skills in the art, multiple variations or modifications may be made under the teachings of the present disclosure. However, those variations and modifications do not depart from the scope of the present disclosure.

Figure 3:
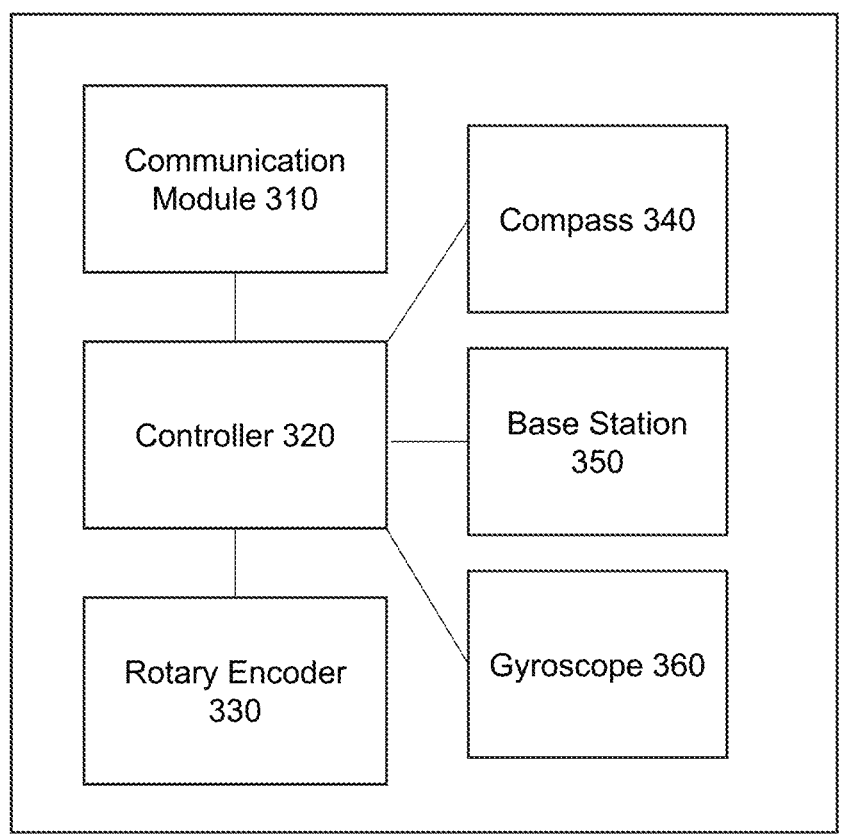
FIG. 3 is a schematic diagram illustrating an exemplary device according to some embodiments of the present disclosure.

FIG. 3 is a schematic diagram illustrating an exemplary device according to some embodiments of the present disclosure. The device 300 is an example of the device 110.

As shown in FIG. 3, the device 300 includes a communication module 310, a controller 320, a rotary encoder 330 (e.g., the left wheel encoder, the right wheel encoder), a compass 340, a base station 350, and a gyroscope 360. In some embodiments, the communication module 310 is configured to establish data/signal transmission. In some embodiments, the communication module 310 implements communication transmission via I/O communication, TCP communication, etc. In some embodiments, the communication module 310 is controlled by the controller 320. For example, the controller 320 controls the communication module 310 to transmit the target location information (e.g., the coordinate) and/or the target orientation information (e.g., an angle of a direction of a front portion of the vehicle 300 relative to a reference direction) of the device 300 to a monitoring center. In some embodiments, the monitoring center includes a terminal, e.g., a server (e.g., the server 120), a computer, a mobile phone, etc.

In some embodiments, the controller 320 is configured to obtain data/signals, store data/signals, and/or process data/signals. The controller 320 obtains the first location information generated by the UWB positioning system, the speed information generated by the rotary encoder 330, the first orientation information generated by the compass 340, the angle velocity information generated by the gyroscope 360, or the like, or any combination thereof. In some embodiments, the controller 320 executes calculation based on pre-stored algorithms, formulas, and/or the obtained information.

In some embodiments, the rotary encoder 330 is disposed in the device 300. In some embodiments, the rotary encoder 330 is configured to measure/obtain the speed information. In some embodiments, the speed information associated with the device 300 includes speeds of a left wheel and a right wheel of the device 300, a speed of the device 300, tick values of the rotary encoder 330 (e.g., the left wheel encoder and the right wheel encoder) of two wheels (e.g., the left wheel, the right wheel) of the device 300, a tick value of the device 300 by moving one meter, a distance between the left wheel and the right wheel of the device 300, or the like, or any combination thereof. In some embodiments, the speed information associated with the device 300 is obtained by the rotary encoder 330 disposed in the device 300. As used herein, a tick value represents a count of pulses emitted by the rotary encoder 330 while the rotary encoder 330 rotates. In some embodiments, the rotary encoder 330 transmits the speed information to the controller 320. In some embodiments, the rotary encoder 330 includes a shaft type rotary encoder (e.g., a clamping flange type rotary encoder, a synchronous flange type rotary encoder, a servo mounting type rotary encoder), a shaft sleeve type rotary encoder (e.g., a half-air type rotary encoder, a full-air type rotary encoder, a large-diameter type rotary encoder), or the like, or any combination thereof.

In some embodiments, the compass 340 is disposed in the device 300. In some embodiments, the compass 340 is configured to measure/obtain the first orientation information (e.g., a reading of the compass 340). In some embodiments, the compass 340 transmits the obtained first orientation information to the controller 320.

In some embodiments, the base station 350 is disposed in the device 300. In some embodiments, the base station 350 is configured to receive ultra-wideband (UWB) signals. In some embodiments, the base station 350 converts the received UWB signals into data and transmits the data to the controller 320.

In some embodiments, the gyroscope 360 is disposed in the device 300. In some embodiments, the gyroscope 360 is configured to obtain the angle velocity information. In some embodiments, the gyroscope 360 transmits the obtained angle velocity information to other components of the device 300, e.g., the controller 320.

Figure 4:
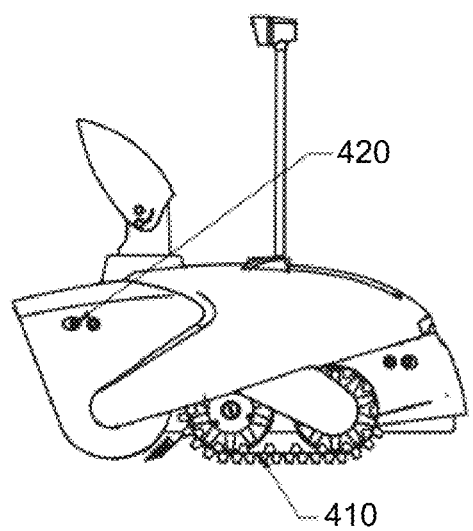
FIG. 4 is a front view of an exemplary device according to some embodiments of the present disclosure.
Figure 5:
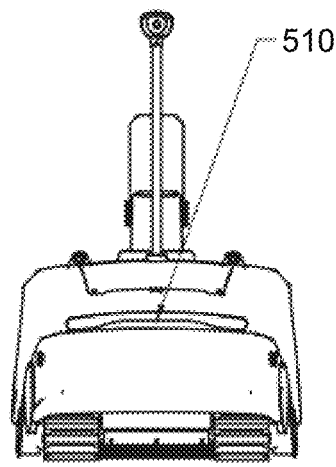
FIG. 5 is a right view of an exemplary device according to some embodiments of the present disclosure.
Figure 6:
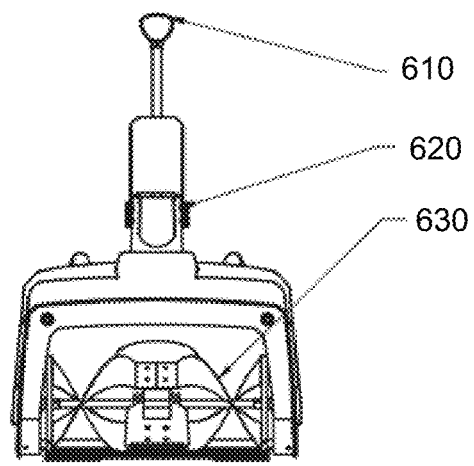
FIG. 6 is a left view of an exemplary device according to some embodiments of the present disclosure.
Figure 7:
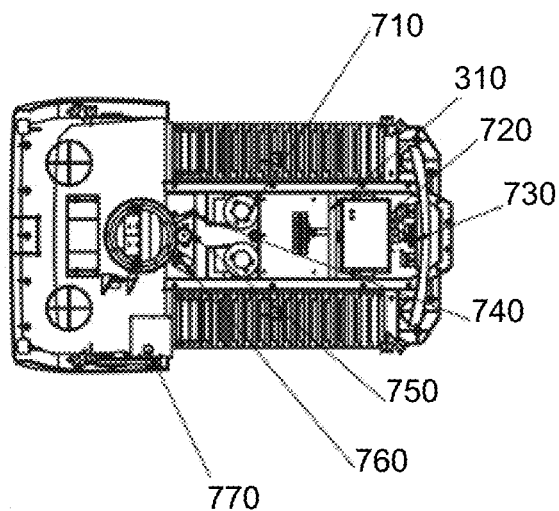
FIG. 7 is a top view of an exemplary device according to some embodiments of the present disclosure.

FIG. 4 is a front view of an exemplary device according to some embodiments of the present disclosure. FIG. 5 is a right view of an exemplary device according to some embodiments of the present disclosure. FIG. 6 is a left view of an exemplary device according to some embodiments of the present disclosure. FIG. 7 is a top view of an exemplary device according to some embodiments of the present disclosure. The device 400/500/600/700 is an example of the device 110.

As shown in FIG. 4, a crawler 410 and an ultrasonic sensor 420 are disposed in the device 400. The ultrasonic sensor 420 is configured to facilitate the vehicle 400 to avoid obstacles. In some embodiments, the ultrasonic sensor 420 emits an acoustic wave. When the acoustic wave detects an obstacle, the acoustic wave is reflected back and received by the ultrasonic sensor 420. A distance of the vehicle 400 to the obstacle is determined and a corresponding avoiding action (e.g., stopping, turning a direction) is performed by the vehicle 400 accordingly. In some embodiments, the crawler 410 is configured to facilitate the device 400 to move in a specific application scenario (e.g., snow).

As shown in FIG. 5, a tail light 510 is disposed in the device 500 for illuminating and/or indicating the presence of the device 500 for other devices in the environment. As shown in FIG. 6, a camera 610 is disposed in the device 600. The camera 610 is configured to obtain image information (e.g., an image, a video) of a road condition of the environment. In some embodiments, a base station (e.g., the base station 350) of the UWB positioning system is disposed in the camera 610.

As shown in FIG. 6, a snow throwing tube 620 is disposed in the device 600. The snow throwing tube 620 is configured to throw snow. In some embodiments, the snow throwing tube 620 is rotatable by 360 degrees. A distance for throwing the snow is adjustable. In some embodiments, a paddle 630 is disposed in a front portion of the device 600. The paddle 630 is configured to sweep/clean the snow.

As shown in FIG. 7, the device 700 includes a movement drive module 710, a low-temperature resistant rechargeable battery 720, a passive charging and energizing module 730, a first photoelectric sensor 740, a direct current (DC) gear motor 750, a second photoelectric sensor 760, and a drive motor 770. In some embodiments, the movement drive module 710 is configured to drive the device 700 to move. For example, the movement drive module 710 drives a crawler (e.g., the crawler 410) of the device 700 to move. In some embodiments, the movement drive module 710 includes a motor, a drive rod, etc.

In some embodiments, the low-temperature resistant rechargeable battery 720 is configured to provide electrical energy in a power-off state. For example, when the device 700 fails to connect to other energy sources, the low-temperature resistant rechargeable battery 720 provides electrical energy required for an operation of the device 700. In some embodiments, the low-temperature resistant rechargeable battery 720 provides electrical energy in a power-on state. For example, an operator of the device 700 controls the low-temperature resistant rechargeable battery 720 to provide electrical energy in the power-on state.

In some embodiments, the passive charging and energizing module 730 are configured to charge passively. When a remaining power of the low-temperature resistant rechargeable battery 720 remains lower than a preset value (e.g., 1%, 5%), the passive charging and energizing module 730 automatically start to charge. In some embodiments, the passive charging and energizing module 730 are in communication with a charging electrode of the device 700 to achieve the passive charging.

In some embodiments, the first photoelectric sensor 740 is configured to count gear teeth and determines a corresponding rotation angle. In some embodiments, the first photoelectric sensor 740 records a count of teeth rotated by a gear during a rotation, and the rotation angle is determined based on an angle corresponding to each tooth and the count of teeth.

In some embodiments, the DC gear motor 750 is configured to drive and/or provides power to other components of the device 700 (e.g., the snow throwing tube). In some embodiments, the DC gear motor 750 includes a DC motor and a gear motor.

In some embodiments, the second photoelectric sensor 760 is configured to detect a rotation origin of the device 700. The rotation origin is a point around which the device 700 rotates. For example, the rotation origin of the device 700 is an origin of the map coordinate system. In some embodiments, the photoelectric sensor 760 detects an offset of the rotation origin, and compensates the offset, thereby improving a positioning accuracy of the device 700. In some embodiments, the first drive motor 770 is configured to drive and/or provides power to other components of the device 700 (e.g., the paddle 630).

Figure 8:
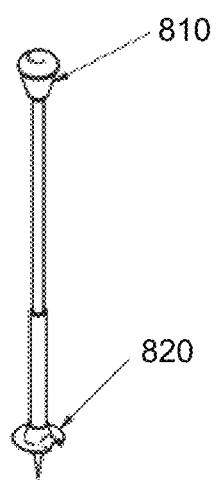
FIG. 8 is a schematic diagram illustrating an exemplary first label according to some embodiments of the present disclosure.

FIG. 8 is a schematic diagram illustrating an exemplary first label according to some embodiments of the present disclosure.

In some embodiments, the positioning system (e.g., the positioning system 100) includes the device (e.g., the device 110) (not shown in FIG. 8), a first label 810, a second label (not shown in FIG. 8), a third label (not shown in FIG. 8), and the base station (not shown in FIG. 8). As shown in FIG. 8, the first label 810 is supported by and/or connected to a base 820 having an insertion portion. In some embodiments, the label 810 transmits the ultra-wideband (UWB) signal to the base station at a certain frequency. It should be noted a structure of the second label or the third label may be similar to or the same as the first label 810. In some embodiments, the second label or the third label is also supported by and/or connected to the base having the insertion portion.

Figure 9:
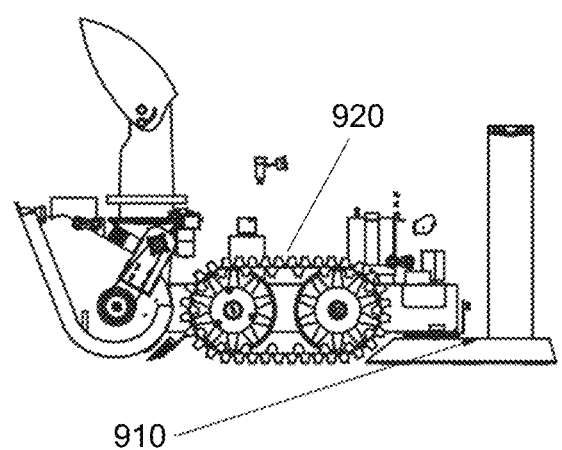
FIG. 9 is a schematic diagram illustrating an exemplary connection between a device and a power supply according to some embodiments of the present disclosure.
Figure 10:
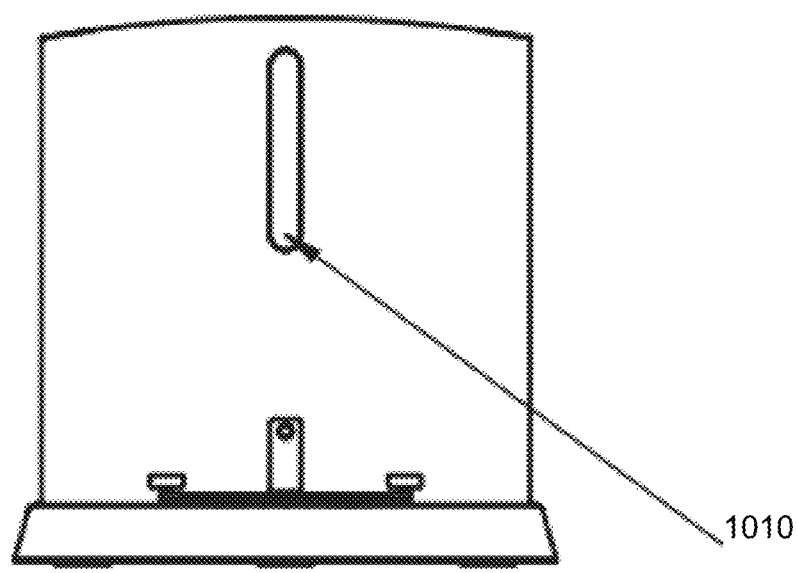
FIG. 10 is a front view of the power supply according to some embodiments of the present disclosure.
Figure 11:
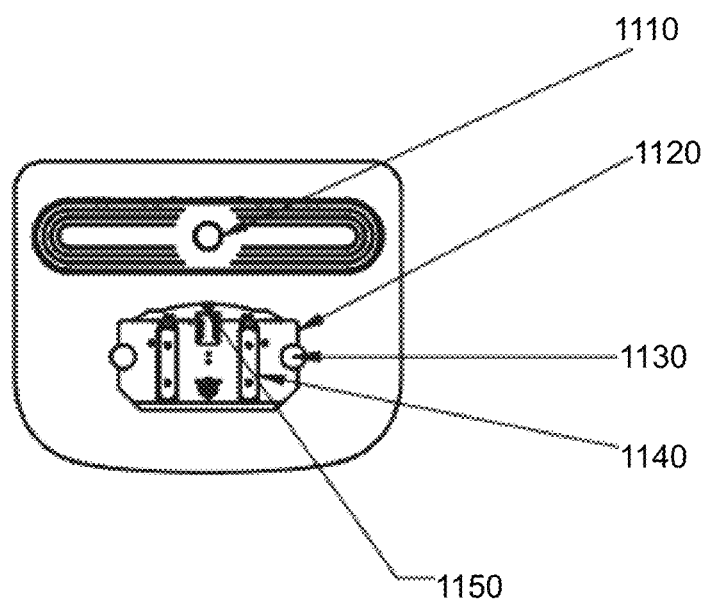
FIG. 11 is a top view of the power supply according to some embodiments of the present disclosure.

FIG. 9 is a schematic diagram illustrating an exemplary connection between a device and a power supply according to some embodiments of the present disclosure. FIG. 10 is a front view of the power supply according to some embodiments of the present disclosure. FIG. 11 is a top view of the power supply according to some embodiments of the present disclosure.

In some embodiments, the positioning system (e.g., the positioning system 100) includes a power supply 910 and a device 920 shown in FIG. 9. The device 920 is the same as or similar to the device described in FIGS. 1-8, the description of which may be not repeated here.

In some embodiments, the power supply 910 is configured to charge, refuel, and/or maintain the device 920. As shown in FIGS. 10-11, the power supply 910 includes an infrared light-emitting diode (LED) light 1010, a switch 1110, a charging adaptation module 1120, a guiding and buffering wheel 1130, a charging electrode 1140, and an in-position sensor 1150.

In some embodiments, the infrared LED light 1010 is configured to remind an operator of the device 920 of a current charging status. In some embodiments, the infrared LED light 1010 displays different colors under different charging statuses. For example, the infrared LED light 1010 displays red during the charging of the device 920. The infrared LED light 1010 displays green when the charging of the device 920 is completed. The infrared LED light 1010 displays yellow when the charging of the device 920 fails.

In some embodiments, the power supply 910 is energized/de-energized by turning on/off of a first switch 1110. In some embodiments, the first switch 1110 is automatically turned off when the charging of the device 920 is completed.

In some embodiments, a charging contact port of the device 920 fails to accurately dock with the power supply 910 and there is a position deviation (e.g., a deviation to the left, a deviation to the right) between the device 920 and the power supply 910. In some embodiments, the charging adaptation module 1120 is configured to adapt the position deviation such that the device 920 is charged normally when the position deviation is within a threshold.

In some embodiments, there is a pressure on the power supply 920 when the device 920 is placed on the power supply 910. The guiding and buffering wheel 1130 is configured to reduce and/or buffer an influence of the pressure on the power supply 920. In some embodiments, the guiding and buffering wheel 1130 is made of rubber.

In some embodiments, the charging electrode 1140 is configured to contact an electrode of the device 920 to achieve the charging. When the in-position sensor 1150 detects that the device 920 is close to the power supply 910 (e.g., a distance between thereof within a threshold (e.g., 5 millimeters, 3 millimeters), the charging electrode 1140 charges the device 920.

Figure 12:
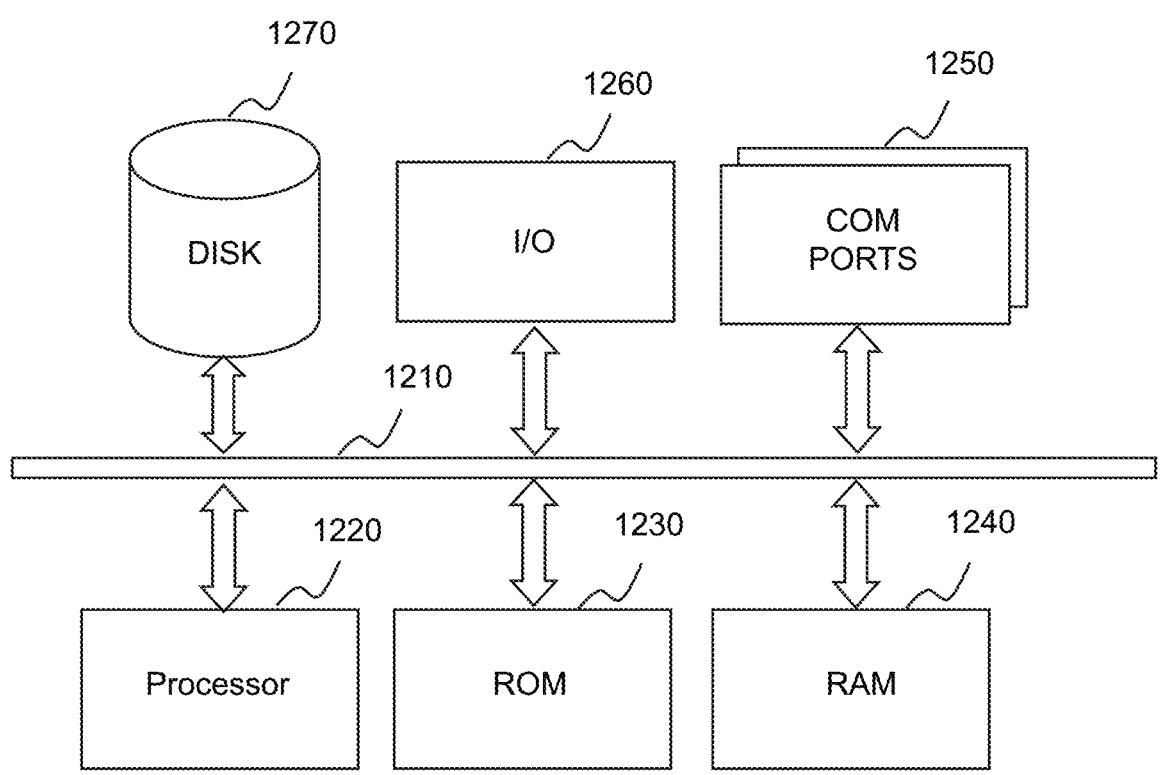
FIG. 12 is a schematic diagram illustrating exemplary hardware and/or software components of an exemplary computing device according to some embodiments of the present disclosure.

FIG. 12 is a schematic diagram illustrating exemplary hardware and/or software components of an exemplary computing device according to some embodiments of the present disclosure. In some embodiments, the server 120 may be implemented on the computing device 1200. For example, the processing device 122 may be implemented on the computing device 1200 and configured to perform functions of the processing device 122 disclosed in this disclosure.

The computing device 1200 may be used to implement any component of the positioning system 100 as described herein. For example, the processing device 122 may be implemented on the computing device 1200, via its hardware, software program, firmware, or a combination thereof. Although only one such computer is shown, for convenience, the computer functions relating to positioning as described herein may be implemented in a distributed fashion on a number of similar platforms to distribute the processing load.

The computing device 1200, for example, may include COM ports 1250 connected to and from a network connected thereto to facilitate data communications. The computing device 1200 may also include a processor (e.g., a processor 1220), in the form of one or more processors (e.g., logic circuits), for executing program instructions. For example, the processor 1220 may include interface circuits and processing circuits therein. The interface circuits may be configured to receive electronic signals from a bus 1210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 1210.

The computing device 1200 may further include one or more storages configured to store various data files (e.g., program instructions) to be processed and/or transmitted by the computing device 1200. In some embodiments, the one or more storages may include a high speed random access memory (not shown), a non-volatile memory (e.g., a magnetic storage device, a flash memory, or other non-volatile solid state memories) (not shown), a disk 1270, a read-only memory (ROM) 1230, or a random-access memory (RAM) 1240, or the like, or any combination thereof. In some embodiments, the one or more storages may further include a remote storage corresponding to the processor 1220. The remote storage may connect to the computing device 1200 via the network 140. The computing device 1200 may also include program instructions stored in the one or more storages (e.g., the ROM 1230, RAM 1240, and/or another type of non-transitory storage medium) to be executed by the processor 1220. The methods and/or processes of the present disclosure may be implemented as the program instructions. The computing device 1200 may also include an I/O component 1260, supporting input/output between the computing device 1200 and other components. The computing device 1200 may also receive programming and data via network communications.

Merely for illustration, only one processor is illustrated in FIG. 12. Multiple processors 1220 are also contemplated; thus, operations and/or method steps performed by one processor 1220 as described in the present disclosure may also be jointly or separately performed by the multiple processors. For example, if in the present disclosure the processor 1220 of the computing device 1200 executes both operation A and operation B, it should be understood that operation A and operation B may also be performed by two different processors 1220 jointly or separately in the computing device 1200 (e.g., a first processor executes operation A and a second processor executes operation B, or the first and second processors jointly execute operations A and B).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 13:
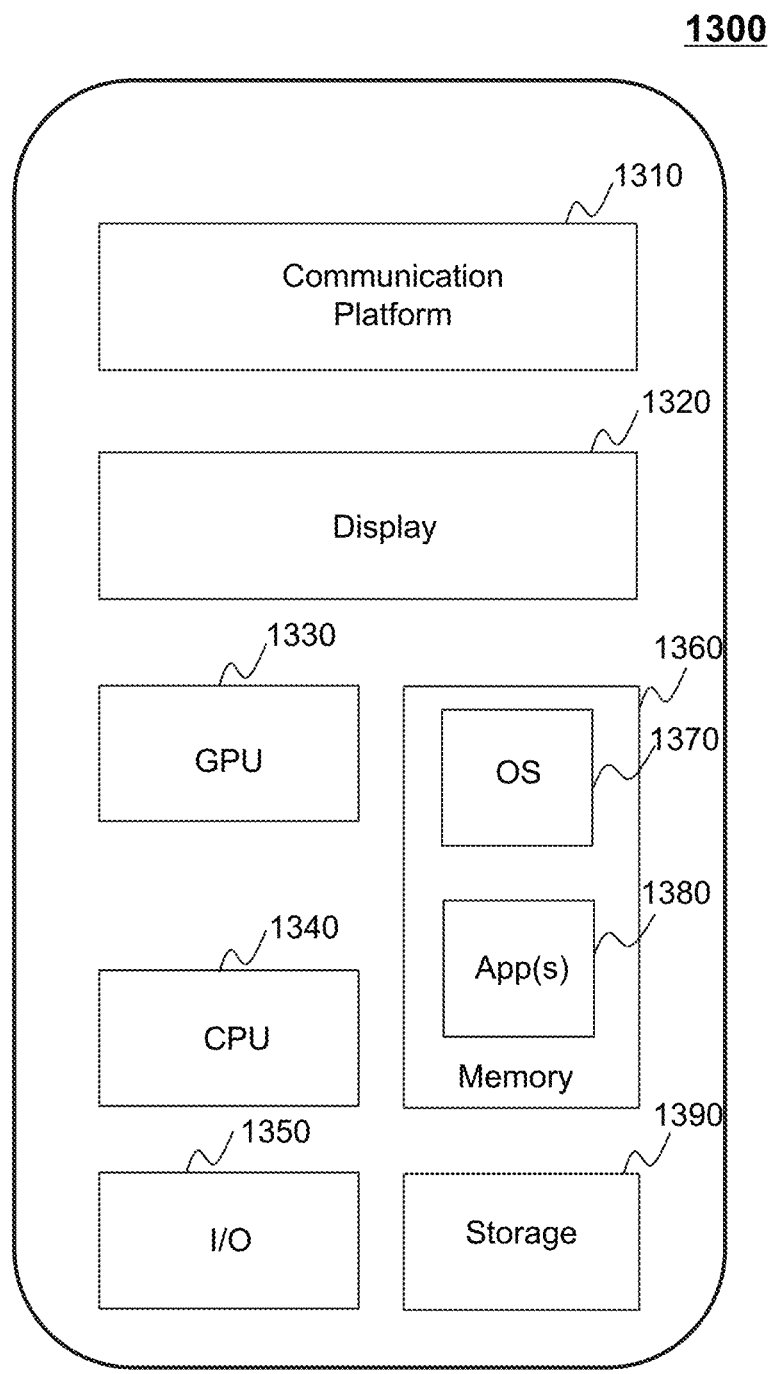
FIG. 13 is a schematic diagram illustrating exemplary hardware and/or software components of an exemplary mobile device according to some embodiments of the present disclosure.

FIG. 13 is a schematic diagram illustrating exemplary hardware and/or software components of an exemplary mobile device according to some embodiments of the present disclosure. In some embodiments, the server 120 (e.g., the processing device 122) may be implemented on the mobile device 1300.

As illustrated in FIG. 13, the mobile device 1300 may include a communication platform 1310, a display 1320, a graphics processing unit (GPU) 1330, a central processing unit (CPU) 1340, an I/O 1350, a memory 1360, a mobile operating system (OS) 1370, and a storage 1390. In some embodiments, any other suitable components, including but not limited to a system bus or a controller (not shown), may also be in the mobile device 1300.

In some embodiments, the mobile operating system 1370 (e.g., iOS™, Android™, Windows Phone™) and one or more applications 1380 may be loaded into the memory 1360 from the storage 1390 in order to be executed by the CPU 1340. The applications 1380 may include a browser or any other suitable mobile apps for receiving and rendering information relating to positioning or other information from the positioning system 100. User interactions with the information stream may be achieved via the I/O 1350 and provided to the processing device 122 and/or other components of the positioning system 100 via the network 140.

Figure 14:
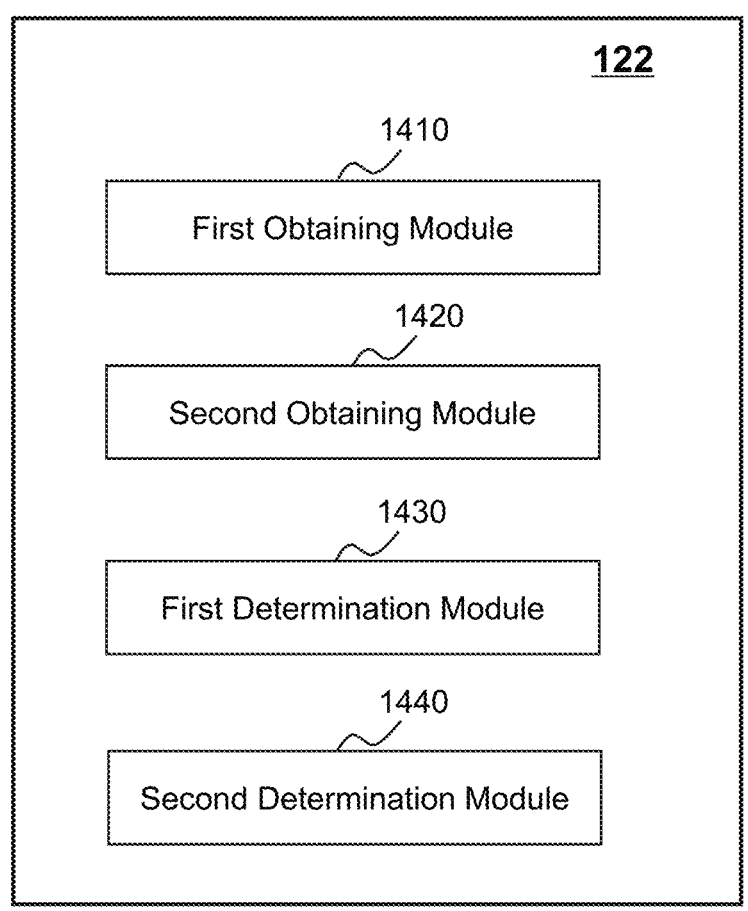
FIG. 14 is a block diagram illustrating an exemplary processing device according to some embodiments of the present disclosure.

FIG. 14 is a block diagram illustrating an exemplary processing device according to some embodiments of the present disclosure. The processing device 122 includes a first obtainment module 1410, a second obtainment module 1420, a first determination module 1430, and a second determination module 1440.

In some embodiments, the first obtainment module 1410 is configured to obtain the location parameter associated with the device. In some embodiments, the location parameter includes the first location information associated with the device, the speed information associated with the device, etc. In some embodiments, the first location information associated with the device is obtained by the ultra wide band (UWB) positioning system. The UWB positioning system includes the base station (e.g., the base station 350), the first label (e.g., the label 810), the second label, and the third label. In some embodiments, the base station is disposed in the device (e.g., the automatic device for sweeping snow). The first location information includes a location of the base station. The location of the base station represents a location of the device in the map coordinate system.

In some embodiments, the speed information associated with the device includes the speeds of the left wheel and the right wheel of the device, the speed of the device, the tick values of the rotary encoders of the two wheels of the device, the tick value of the device by moving one meter, the distance between the left wheel and the right wheel of the device, or the like, or any combination thereof. In some embodiments, the speed information associated with the device is obtained by the rotary encoder disposed in the device. As used herein, the tick value refers to the count of the pulses emitted by the rotary encoder while the rotary encoder rotates. More descriptions of the location parameter may be found elsewhere in the present disclosure, e.g., FIG. 15 and/or the descriptions thereof.

In some embodiments, the second obtainment module 1420 is configured to obtain the orientation parameter associated with the device. In some embodiments, the orientation parameter includes the first orientation information associated with the device, the angle velocity information associated with the device, etc. In some embodiments, the first orientation information refers to the reading of the compass disposed in the device. In some embodiments, the angle velocity information refers to the reading of the gyroscope. More descriptions of the orientation parameter may be found elsewhere in the present disclosure, e.g., FIG. 15 and/or the descriptions thereof.

In some embodiments, the first determination module 1430 is configured to determine the target location information (e.g., the coordinate) of the device by performing the first fusion calculation based on the location parameter. In some embodiments, the first determination module 1430 determines second location information (e.g., a coordinate of the base station) associated with the device by correcting the first location information associated with the device.

In some embodiments, the first determination module 1430 determines an odometry (ODOM) increment based on the speed information associated with the device. The ODOM increment represents a change of locations of the device at different time points based on speed information associated with the device corresponding to different time points. The first determination module 1430 determines an average speed of the device based on the ODOM increment. The first determination module 1430 determines the target location information of the device by performing the first fusion calculation based on the second location information, the ODOM increment, and/or the average speed. More descriptions of the target location information may be found elsewhere in the present disclosure, e.g., FIG. 15 and/or the descriptions thereof.

In some embodiments, the second determination module 1440 is configured to determine the target orientation information of the device by performing the second fusion calculation based on the orientation parameter. As used herein, the target orientation information of the device refers to the angle (also referred to as a target orientation angle) between the direction of the front portion (e.g., the head 210) of the device and the reference direction (e.g., the $x_{device}$- axis in the map coordinate system, the $x_{UWB}$-axis of the UWB coordinate system, the east, the south, the west, the north).

In some embodiments, the second determination module 1440 determines second orientation information by correcting the first orientation information. An accuracy of the second orientation information is higher than an accuracy of the first orientation information. The second determination module 1440 determines the target orientation information of the device based on the second orientation information and the angle velocity information. More descriptions of the target location information may be found elsewhere in the present disclosure, e.g., FIG. 15 and/or the descriptions thereof.

The modules in the processing device 122 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the first obtainment module 1410 and the second obtainment module 1420 are combined as a single module which is configured to obtain the location parameter and the orientation parameter associated with the device. As another example, the processing device 112 includes a storage module (not shown) which is used to store data generated by the above-mentioned modules.

Figure 15:
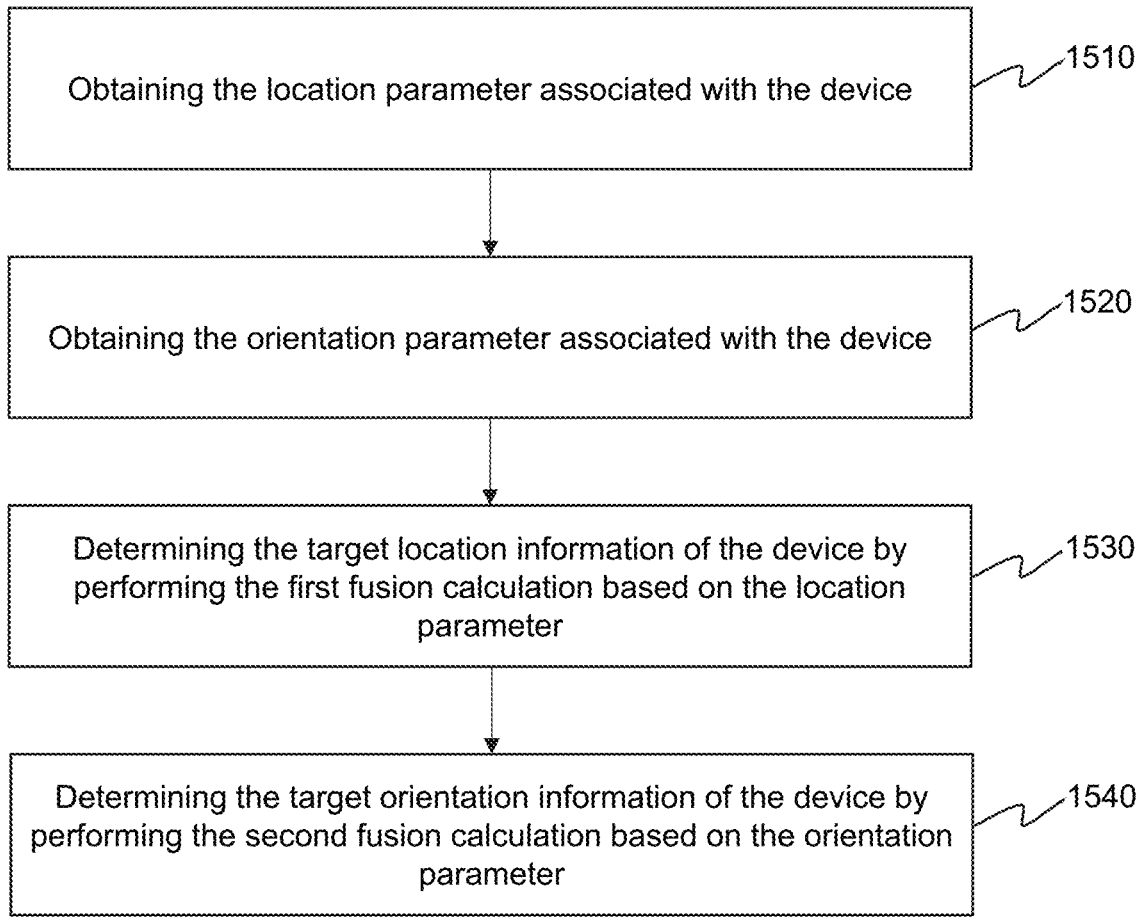
FIG. 15 is a flowchart illustrating an exemplary process for positioning a device according to some embodiments of the present disclosure.

FIG. 15 is a flowchart illustrating an exemplary process for positioning a device according to some embodiments of the present disclosure. In some embodiments, the process 1500 may be implemented as a set of instructions (e.g., an application) stored in the storage ROM 1230 or RAM 1240. The processor 1220 and/or the modules in FIG. 14 may execute the set of instructions, and when executing the instructions, the processor 1220 and/or the modules may be configured to perform the process 1500. The operations of the illustrated process presented below are intended to be illustrative. In some embodiments, the process 1500 may be accomplished with one or more additional operations not described and/or without one or more of the operations herein discussed. Additionally, the order in which the operations of the process illustrated in FIG. 15 and described below is not intended to be limiting.

In 1510, the processing device 122 (e.g., the first obtainment module 1410) obtains the location parameter associated with the device (e.g., the device 110). In some embodiments, the device is configured to perform different functions in different application scenarios, e.g., environmental cleaning, goods transportation, guidance, etc. Merely by way of example, the device is configured to sweep snow, sweep the floor, remove dust, mop the floor, mow the lawn, paint, etc. For illustration purposes, the present disclosure takes the device for sweeping the snow as an example, which may be not intended to limit the scope of the present disclosure. More descriptions of the device may be found elsewhere in the present disclosure, for example, FIGS. 1-11 and the descriptions thereof.

In some embodiments, the location parameter includes the first location information associated with the device, the speed information associated with the device, etc. In some embodiments, the first location information associated with the device is obtained by the ultra wide band (UWB) positioning system. The UWB positioning system includes the base station (e.g., the base station 350), the first label (e.g., the label 810), the second label, and the third label. At least one of the first label, the second label, or the third label is set in different lines. The first label, the second label, the third label, and the base station of the UWB positioning system communicate with each other using a wireless carrier technology. In some embodiments, a label (e.g., a chip, a sensor, etc.) (e.g., the first label, the second label, the third label) transmits the UWB signal to the base station (e.g., the base station 350). In some embodiments, the base station is disposed in the device (e.g., the automatic device for sweeping snow). The first location information includes the location of the base station. The location of the base station represents the location of the device in the UWB coordinate system.

In some embodiments, for the UWB positioning system, a location of the first label is considered as an origin of the UWB coordinate system. A direction of a line passing the first label and the second label is considered as the $x_{UWB}$-axis of the UWB coordinate system. A direction of a line passing the first label and perpendicular to the $x_{UWB}$-axis is considered as a $y_{UWB}$-axis of the UWB coordinate system. That is, a $xoy_{UWB}$ coordinate system (e.g., a Cartesian coordinate system) is constructed using the first label and the second label.

Based on the $xoy_{UWB}$ coordinate system, the third label is installed in the quadrant I. Then an angle $\theta_{13\_x}$ between a line passing the first label and the third label, and the $x_{UWB}$-axis is determined according to formula (1) below:

$$\cos\theta_{13\_x} = \frac{d_{12}^2 + d_{13}^2 - d_{23}^2}{2d_{12}d_{13}} \quad (1)$$

where $d_{12}$ represents a distance between the first label and the second label, $d_{13}$ represents a distance between the first label and the third label, $d_{23}$ represents a distance between the second label and the third label in the $xoy_{UWB}$ coordinate system, (0, 0) represents a coordinate of the first label, ($d_{12}$, 0) represents a coordinate of the second label, and ($d_{13}\cos\theta_{13\_x}$, $d_{13}\sin\theta_{13\_x}$) represents a coordinate of the third label.

After constructing the $xoy_{UWB}$ coordinate system, the UWB positioning system transmits the first location information to the device. In some embodiments, the first location information is determined according to the following formula (2):

$$\begin{bmatrix} x_{UWB} \\ y_{UWB} \end{bmatrix} = (H^T H)^{-1} H^T C/2 \quad (2)$$

where the first location information $$\begin{bmatrix} x_{UWB} \\ y_{UWB} \end{bmatrix}$$

represents the location of the base station in the $xoy_{UWB}$ coordinate system, matrix $$H = \begin{bmatrix} d_{12} & 0 \\ d_{12}\cos\theta_{13\_x} & d_{13}\sin\theta_{13\_x} \end{bmatrix},$$

-continued $$\text{matrix } C = \begin{bmatrix} d_{12}^2 - (r_2^2 - r_1^2) \\ (d_{13}\cos\theta_{13\_x})^2 + (d_{13}\sin\theta_{13\_x})^2 - (r_2^2 - r_1^2) \end{bmatrix},$$

$r_1$ represents a distance between the base station and the first label, $r_2$ represents a distance between the base station and the second label, and $r_3$ represents the distance between the base station and the third label.

In some embodiments, the speed information associated with the device includes the speeds of the left wheel and the right wheel of the device, the speed of the device, the tick values of the rotary encoders of the two wheels of the device, the tick value of the device by moving one meter, the distance between the left wheel and the right wheel of the device, or the like, or any combination thereof. In some embodiments, the speed information associated with the device is obtained by the rotary encoders (e.g., the left wheel encoder, the right wheel encoder) disposed in the device. As used herein, the tick value refers to the count of pulses emitted by the rotary encoder while the rotary encoder rotates.

In 1520, the processing device 122 (e.g., the second obtainment module 1420) obtains the orientation parameter associated with the device. In some embodiments, the orientation parameter includes the first orientation information associated with the device, the angle velocity information associated with the device, etc. In some embodiments, the first orientation information refers to the reading of the compass disposed in the device. In some embodiments, the angle velocity refers to the reading of the gyroscope disposed in the device.

In 1530, the processing device 122 (e.g., the first determination module 1430) determines the target location information (e.g., a coordinate) of the device by performing the first fusion calculation (e.g., a maximum likelihood estimate technique, a technique of least squares) based on the location parameter. In some embodiments, an accuracy of the target location information is higher than an accuracy of the location parameter (e.g., the first location information, the speed information) associated with the device obtained in 1510. In some embodiments, the processing device 122 determines the target location information of the device via, e.g., the controller 320.

In some embodiments, the processing device 122 determines the second location information (e.g., the coordinate of the base station) associated with the device by correcting the first location information associated with the device. An accuracy of the second location information is higher than that an accuracy of the first location information. In some embodiments, the processing device 122 determines the second location information by performing a straight line fitting of the first location information using the technique of least squares.

In some embodiments, the processing device 122 corrects the first location information according to the formula (3) below:

$$r_{modify} = (r_{uwb\_raw} - b_{uwb})/k_{uwb} \quad (3)$$

where $r_{modify}$ represents to the second location information, $r_{uwb\_raw}$ represents the first location information obtained by the UWB positioning system, $k_{uwb}$ represents a slope of a straight line obtained by performing the straight line fitting of the first location information using the technique of least squares, and $b_{uwb}$ represents an intercept obtained by performing the straight line fitting of the first location information using the technique of least squares.

In some embodiments, the processing device 122 determines the odometry (ODOM) increment based on the speed information associated with the device. The ODOM increment represents the change of the locations of the device at different time points based on the speed information associated with the device corresponding to different time points. In some embodiments, the processing device 122 determines the ODOM increment according to the formulas (4)-(7) below:

$$d_{device\_odom} = \frac{(n_{tick\_left} + n_{tick\_right})/2}{N_{tick\_1m}} \quad (4)$$

$$\gamma_{device} = \frac{(n_{tick\_right} - n_{tick\_left})/l_{width}}{N_{tick\_1m}} \quad (5)$$

$$x_{device\_odom} = d_{device\_odom} \cos\gamma_{device} \quad (6)$$

$$y_{device\_odom} = d_{device\_odom} \sin\gamma_{device} \quad (7)$$

where $d_{device\_odom}$ represents a distance that was traveled by the device, $n_{tick\_left}$ represents the tick value rotated by the left wheel encoder of the device, $n_{tick\_right}$ represents the tick value rotated by the right wheel encoder of the device, $N_{tick\_1m}$ represents the tick value rotated by the left or right wheel encoder of the device by moving one meter, $l_{width}$ represents the distance between the left wheel and the right wheel of the device, $x_{device\_odom}$ represents an ODOM increment in the $x_{device}$-axis, $y_{device\_odom}$ represents an ODOM increment in the $y_{device}$-axis, and $\gamma_{device}$ represents a rotation angle (e.g., the angle between the direction of the front portion of the device and the reference direction) of the device.

In some embodiments, the processing device 122 determines the average speed of the device based on the ODOM increment. The processing device 122 determines the average speed of the device according to formulas (8)-(9) below:

$$v_{device\_odom\_x} = x_{device\_odom}/dt \quad (8)$$

$$v_{device\_odom\_y} = y_{device\_odom}/dt \quad (9)$$

where $v_{device\_odom\_x}$ represents an average speed of the device in the $x_{device}$-axis, $v_{device\_odom\_y}$ represents an average speed of the device in the $y_{device}$-axis, and dt represents a time interval between two readings of the rotary encoder.

In some embodiments, the processing device 122 determines the target location information of the device by performing the first fusion calculation based on the second location information, the ODOM increment, and/or the average speed. In some embodiments, the processing device 122 determines the target location information according to formulas (10)-(16) below:

$$dx_{device\_odom} = dT \times (v_{device\_odom\_x\_i-1} + v_{device\_odom\_x\_i})/2; \quad (10)$$

$$dy_{device\_odom} = dT \times (v_{device\_odom\_y\_i-1} + v_{device\_odom\_y\_i})/2; \quad (11)$$

-continued $$\begin{bmatrix} dx_{UWB\_odom} \\ dy_{UWB\_odom} \end{bmatrix} = \begin{bmatrix} \cos\varphi & -\sin\varphi \\ \sin\varphi & \cos\varphi \end{bmatrix} \begin{bmatrix} dx_{device\_odom} \\ dy_{device\_odom} \end{bmatrix}; \quad (12)$$

$$x_{UWB\_odom\_i} = x_{UWB\_odom\_i-1} + dx_{UWB\_odom}; \quad (13)$$

$$y_{UWB\_odom\_i} = y_{UWB\_odom\_i-1} + dy_{UWB\_odom}; \quad (14)$$

$$\begin{bmatrix} x_{UWB\_i} \\ y_{UWB\_i} \end{bmatrix} = K_i \times \left( \begin{bmatrix} x_{UWB\_TOF\_i} \\ y_{UWB\_TOF\_i} \end{bmatrix} - \begin{bmatrix} x_{UWB\_odom\_i} \\ y_{UWB\_odom\_i} \end{bmatrix} \right) + \begin{bmatrix} x_{UWB\_i-1} \\ y_{UWB\_i-1} \end{bmatrix}; \quad (15)$$

$$K_i = \overline{P}_i/(\overline{P}_i + R); \overline{P}_i = P_i + Q; P_i = (I - K_{i-1})\overline{P}_{i-1}; \quad (16)$$

where (i−1) represents a first time point, i represents a second time point; dT represents a time interval of two first fusion calculations (that is, a difference between the first time point and the second time point), $dx_{device\_odom}$ represents an ODOM increment along with the $x_{device}$-axis during dT, $dy_{device\_odom}$ represents an ODOM increment along with the $y_{device}$-axis during dT, $\varphi$ represents an angle between the $x_{device}o_{device}y_{device}$ coordinate system and the UWB coordinate system, $dx_{UWB\_odom}$ represents an ODOM increment along with the $x_{UWB}$-axis during dT, $dy_{UWB\_odom}$ represents an ODOM increment along with the $y_{UWB}$-axis during dT, $x_{UWB\_odom}$ represents an ODOM accumulated value along with the $x_{UWB}$-axis at the time point i, $y_{UWB\_odom\_i}$ represents an ODOM accumulated value along with the $y_{UWB}$-axis at the time point i, $$\begin{bmatrix} x_{UWB\_TOF\_i} \\ y_{UWB\_TOF\_i} \end{bmatrix}$$

represents a coordinate provided by the UWB positioning system at the time point i under the UWB coordinate system, $$\begin{bmatrix} x_{UWB\_i} \\ y_{UWB\_i} \end{bmatrix}$$

represents the target location information of the device at the time point i under the UWB coordinate system, R represents a variance matrix of noise of the first location information obtained by the UWB positioning system, Q represents a variance matrix of noise of the ODOM increment, I represents a unit matrix, $K_i$ represents a Kalman filter coefficient matrix, P represents a covariance matrix of errors, $\overline{P}_i$ represents a sum of the covariance matrix of errors at the time point i, and the variance matrix of noise of the ODOM increment.

In 1540, the processing device 122 (e.g., the second determination module 1440) determines the target orientation information of the device by performing the second fusion calculation (e.g., the maximum likelihood estimate technique, the technique of least squares) based on the orientation parameter. As used herein, the target orientation information of the device refers to the angle (also referred to as the target orientation angle) between the direction of the front portion (e.g., the head 210) of the device and the reference direction (e.g., the $x_{device}$-axis in the map coordinate system, the $x_{UWB}$-axis of the UWB coordinate system, the east, the south, the west, the north). The target orientation information includes the angle (e.g., angle $\varphi$ in FIG. 2) between the direction of the head of the device and the $x_{device}$-axis in the map coordinate system. Taking the device for sweeping snow as an example, the direction of the front portion (e.g., the head) of the device represents a direction for sweeping the snow. In some embodiments, an accuracy of the target orientation information is higher than an accuracy of the first orientation information and/or the angle velocity information associated with the device obtained in 1520.

In some embodiments, the processing device 122 determines the second orientation information by correcting the first orientation information. An accuracy of the second orientation information is higher than an accuracy of the first orientation information. In some embodiments, the processing device 122 obtains compass data by rotating the device by a circle. The processing device 122 determines the second orientation information by correcting the first orientation information based on the compass data. In some embodiments, the processing device 122 determines at least one correction parameter associated with the first orientation information according to formulas (17)-(20) below:

$$k_{geo\_x} = 1 \quad (17)$$

$$k_{geo\_y} = \frac{m_{geo\_x\_max} - m_{geo\_x\_min}}{m_{geo\_y\_max} - m_{geo\_y\_min}} \quad (18)$$

$$b_{geo\_x} = (m_{geo\_x\_max} + m_{geo\_x\_min})/2 \quad (19)$$

$$b_{geo\_y} = (m_{geo\_y\_max} + m_{geo\_y\_min})/2 \quad (20)$$

where a dataset ($m_{geo\_x\_raw}$, $m_{geo\_y\_raw}$) of the first orientation information is obtained by rotating the device by a circle, $m_{geo\_x\_raw}$ represents all compass outputs of the compass in the $x_{geo}$-axis, $m_{geo\_y\_raw}$ represents all compass outputs of the compass in the $y_{geo}$-axis, $m_{geo\_x\_max}$ represents the maximum value in the dataset $m_{geo\_x\_raw}$, $m_{geo\_y\_max}$ represents the maximum value in the dataset $m_{geo\_y\_raw}$, $m_{geo\_x\_min}$ represents the minimum value in the dataset $m_{geo\_x\_raw}$, $m_{geo\_y\_min}$ represents the minimum value in the dataset $m_{geo\_y\_raw}$, $k_{geo\_x}$ represents a correction parameter in the $x_{geo}$-axis, $k_{geo\_y}$ represents an offset parameter in the $x_{geo}$-axis, $b_{geo\_x}$ represents a correction parameter in the $y_{geo}$-axis, and $b_{geo\_y}$ represents an offset parameter in the $y_{geo}$-axis.

In some embodiments, the processing device 122 determines the second orientation information based on the at least one correction parameter. For example, the processing device 122 determines the second orientation information according to the formulas (21)-(22) below:

$$m_{geo\_x} = k_{geo\_x}(m_{geo\_x\_raw} - b_{geo\_x}) \quad (21)$$

$$m_{geo\_y} = k_{geo\_y}(m_{geo\_y\_raw} - b_{geo\_y}) \quad (22)$$

where $m_{geo\_x}$ represents a corrected magnetic field strength in the $X_{geo}$-axis and $m_{geo\_y}$ represents a corrected magnetic field strength in the $Y_{geo}$-axis direction.

Assume that the device only operates in a horizontal plane, the processing device 122 determines the target orientation information of the device based on the second orientation information. In some embodiments, the processing device 122 determines the target orientation information according to formula (23) below:

$$\varphi_{m\_geo} = \arctan\frac{m_{geo\_y}}{m_{geo\_x}} \quad (23)$$

where $\varphi_{m\_geo}$ represents intermediate corrected orientation information of the device determined based on a local geodetic coordinate system. In some embodiments, a range of $\varphi_{m\_geo}$ determined according to formula (23) is $(-\pi/2, \pi/2)$, which is not used in the orientation determination directly. The range is expanded from $(-\pi/2, \pi/2)$ to $[-\pi, \pi]$. When $|m_{geo\_x}{}^n| < 0.0001$, if $m_{geo\_y}{}^n > 0$, $\varphi_{geo\_corrected} = -\pi/2$; if $m_{geo\_y}{}^n < 0$, $\varphi_{geo\_corrected} = \pi/2$, when $|m_{geo\_y}{}^n| < 0.0001$, if $m_{geo\_x}{}^n > 0$, $\varphi_{geo\_corrected} = \pi$; if $m_{geo\_x}{}^n < 0$, $\varphi_{geo\_corrected} = -\pi$, when $m_{geo\_x}{}^n > 0.0001$, $\varphi_{geo\_corrected} = \varphi_{m\_geo}$, and when $m_{geo\_x}{}^n < -0.0001$, if $m_{geo\_y}{}^n > 0$, $\varphi_{geo\_corrected} = \varphi_{geo\_raw} - \pi$; if $m_{geo\_y}{}^n < 0$, $\varphi_{geo\_corrected} = \varphi_{m\_geo} + \pi$, where $\varphi_{geo\_corrected}$ represents corrected orientation information, and n represents a count of $m_{geo\_x}$ included in the dataset $m_{geo\_x}$.

In some embodiments, the target orientation of the device based on the local geodetic coordinate system is equal to a sum of $\varphi_{geo\_corrected}$ and a magnetic declination of an environment where the device is located. Take the environment being Shenzhen as an example, the magnetic declination of Shenzhen is -2.9833 degrees. If the device is aligned to an x-axis of the local geodetic coordinate system, the compass reading is $m_{geo\_x\_raw} = 0.17$, $m_{geo\_y\_raw} = 2.05$, after the correction operation, $m_{geo\_x} = -0.49$, $m_{geo\_y} = 1.7745$. The target orientation angle of the device is 102.45 degrees.

In some embodiments, the processing device 122 determines the target orientation information of the device based on the second orientation information and the angle velocity information. The processing device 122 determines the orientation information provided by the gyroscope at a time point according to formulas (24)-(25) below:

$$\varphi_{gyro\_i} = \varphi_{gyro\_i-1} + d\varphi_{gyro} \quad (24)$$

$$d\varphi_{gyro} = dT(\omega_{gyro\_i-1} + \omega_{gyro\_i})/2 \quad (25)$$

where i represents the time point, (i-1) represents a time point before the time point i, dT represents a time interval between the time point i and the time point (i-1), $\varphi_{gyro\_i}$ represents orientation information at the time point i based on a gyroscope coordinate system, $\varphi_{gyro\_i-1}$ represents orientation information at the time point (i-1) based on the gyroscope coordinate system, $d\varphi_{gyro}$ represents an increment of an angle while the device rotates during dT, $\omega_{gyro\_i-1}$ represents an angle velocity provided by the gyroscope at the time point (i-1), and $\omega_{gyro\_i}$ represents an angle velocity provided by the gyroscope at the time point i.

In some embodiments, the device 110 moves forward along a straight line (e.g., not along the $y_{UWB}$-axis) for one meter before obtaining available orientation information based on the UWB coordinate system. Then the processing device 122 records a start location $P_0(x_{UWB\_0}, y_{UWB\_0})$ and a stop location $P_1(x_{UWB\_1}, y_{UWB\_1})$ of the device for the first fusion calculation in 1530. A vector that starts with $P_0$ and points to $P_1$ is noted as $P_0P_1$. An angle $\theta_{UWB\_P0P1}$ between the vector $P_0P_1$ and the $x_{UWB}$-axis is determined according to formula (26):

$$\theta_{UWB\_P0P1} = \arctan\frac{y_{UWB\_1} - y_{UWB\_0}}{x_{UWB\_1} - x_{UWB\_0}} \quad (26)$$

At the same time, the processing device 122 records a movement orientation (e.g., which is noted as $\varphi_{geo\_init}$) of the device for the second fusion calculation in 1540. An angle $\varphi_{geo\_to\_UWB}$ between the $x_{UWB}$-axis and the $x_{geo}$-axis is determined according to formula (27):

$$\varphi_{geo\_to\_UWB} = \varphi_{geo\_init} - \theta_{UWB\_P0P1} \quad (27)$$

where the angle $\varphi_{geo\_to\_UWB}$ is a constant value and is used for converting orientation information from the local geodetic coordinate system to the UWB coordinate system.

In some embodiments, the processing device 122 determines the target orientation information corresponding to the time point according to the formulas (28)-(30):

$$\varphi_{geo\_i} = K_i(\varphi_{geo\_corrected\_i} - \varphi_{gyro\_i}) + \varphi_{geo\_i-1} \quad (28)$$

$$\theta_{UWB\_i} = \phi_{geo\_i} - \varphi_{geo\_to\_UWB} \quad (29)$$

$$K_i = \overline{P}_i/(\overline{P}_i + R); \overline{P}_i = P_i + Q; P_i = (1 - K_{i-1})\overline{P}_{i-1} \quad (30)$$

where i represents the time point, $\varphi_{geo\_i}$ represents fused target orientation information at the time point i based on the geodetic coordinate system, $\varphi_{geo\_i-1}$ represents fused target orientation information at the time point (i-1) based on the geodetic coordinate system, $\theta_{UWB\_i}$ represents fused target orientation information at the time point i based on the UWB coordinate system, R represents a covariance matrix of noise of the first orientation information obtained by the compass, Q represents a covariance matrix of noise of the angle velocity obtained by the gyroscope, K represents a Kalman filter coefficient, P represents a state covariance of errors, K and P are considered as intermediate variables, $\overline{P}$ represents a sum of state covariance matrix at the time point i and the covariance matrix of noise of the angle velocity, $\varphi_{gyro\_i}$ represents the orientation information provided by the gyroscope at the time point I, and $\varphi_{geo\_corrected\_i}$ represents the corrected orientation information provided by the compass at the time point i. In some embodiments, the processing device 122 designates the fused target orientation information at the time point i based on the UWB coordinate system as the target orientation information corresponding to the time point i. The processing device 122 designates the fused target orientation information at the time point (i-1) based on the UWB coordinate system as the target orientation information corresponding to the time point (i-1).

In some embodiments, the processing device 122 controls the communication module (e.g., the communication module 310) of the device to transmit the target location information and the target orientation information of the device to a monitoring center via the controller of the device. The monitoring center includes a terminal, e.g., a server (e.g., the server 120), a mobile phone, a computer, etc.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, the device performs a uniform linear motion from a first time point to a second time point and a non-uniform linear motion from the second time point to a third time point. As used herein, the uniform linear motion refers to a motion along a straight line with a constant velocity. The non-uniform linear motion refers to a motion along a straight line or a non-straight line with variable velocities.

For the uniform linear motion of the device, the processing device 122 generates a first fitting result by performing a first straight line fitting of first location information or speed information associated with the device corresponding to different time points between the first time point and the second time point. The processing device 122 determines target location information of the device corresponding to any time point between the first time point and the second time point based on the first fitting result. In some embodiments, the processing device 122 also generates a second fitting result by performing a second straight line fitting of first orientation information or angle velocity information associated with the device corresponding to different time points between the first time point and the second time point. The processing device 122 determines target orientation information of the device corresponding to any time point between the first time point and the second time point based on the second fitting result.

In some embodiments, the process for determining the target location information or the target orientation information for the uniform linear motion is similar to the process for determining the second location information according to formula (3) above, the description of which may be not repeated here.

For the non-uniform linear motion, the processing device 122 determines target location information and target orientation information corresponding to any time point between the second time point and the third time point based at least on target location information and target orientation information of the device corresponding to the second time point determined by the first straight line fitting and the second straight line fitting, respectively. In some embodiments, the processing device 122 determines the target location information corresponding to the time point based on the target location information corresponding to the second time point and a change of first location information or speed information between the second time point and the time point. The processing device 122 determines the target orientation information corresponding to the time point based on the target orientation information corresponding to the second time point and a change of first orientation information or angle velocity information between the second time point and the time point.

In some embodiments, the process for determining the target location information for the non-uniform linear motion is similar to the process for determining the target location information described in formulas (10)-(16) above, the descriptions of which may be not repeated here. The process for determining the target orientation information for the non-uniform linear motion is similar to the process for determining the target orientation information described in formulas (24)-(30) above, the descriptions of which may be not repeated here.

Figure 16:
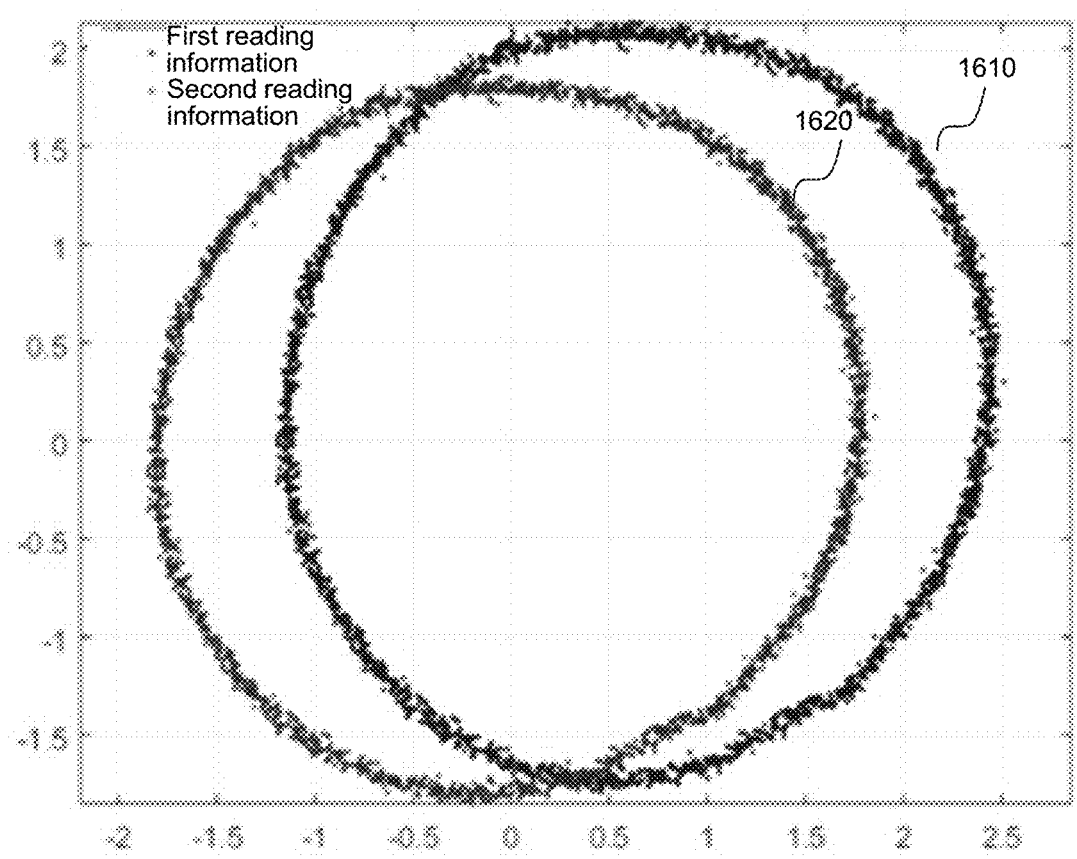
FIG. 16 is a schematic diagram illustrating an exemplary correction of first orientation information according to some embodiments of the present disclosure.

FIG. 16 is a schematic diagram illustrating an exemplary correction of first orientation information according to some embodiments of the present disclosure.

As shown in FIG. 16, there are 2411 groups of first orientation information, $(m''_{x\_raw}, m''_{y\_raw})$ where $n \in (0, 2410)$. Each of the 2411 groups of the first orientation information is represented by a point 1610. In FIG. 16, the horizontal axis represents values of $m''_{x\_raw}$ and the vertical axis represents values of $m''_{y\_raw}$. Correction parameters are determined based on the 2411 groups of the first orientation information according to formulas (17)-(20) above. The determination result is: $k_x=1.0$, $b_x=0.66$, $k_y=0.94$, and $b_{y=0.17}$. 2411 groups of second orientation information are determined by correcting the 2411 groups of the first orientation information based on the correction parameters. Each of the 2411 groups of the second orientation information is represented by a point 1620. The 2411 groups of the first orientation information are obtained by rotating a device (e.g., the device 110, the device in FIG. 15) y a circle. Ideal first orientation information is a perfect circle with the center at the origin (e.g., (0,0) in FIG. 16). As shown in FIG. 16, the first circle formed by points 1620 is closer to a perfect circle than the second circle formed by points 1610. The center of the first circle is closer to the origin (e.g., (0, 0) in FIG. 16) than the center of the second circle. Thus the correction process is effective.

Figure 17:
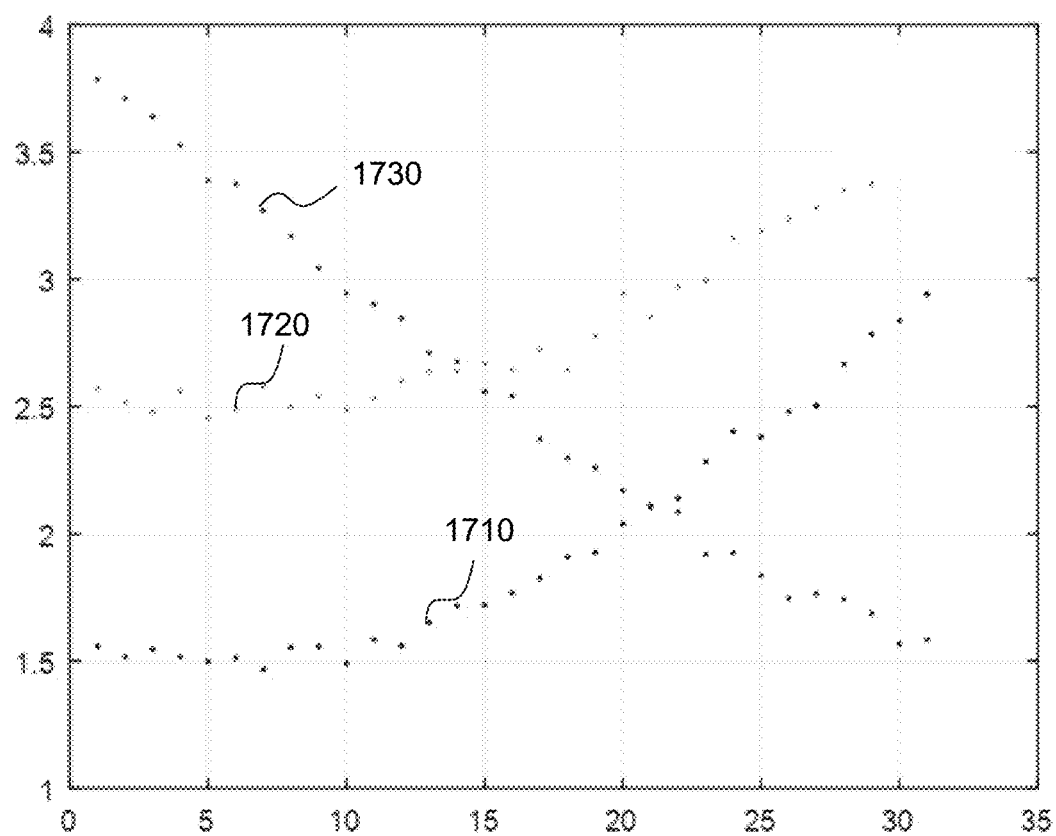
FIG. 17 is a schematic diagram illustrating exemplary distances between a first label, a second label, a third label, and a base station according to some embodiments of the present disclosure.
Figure 18:
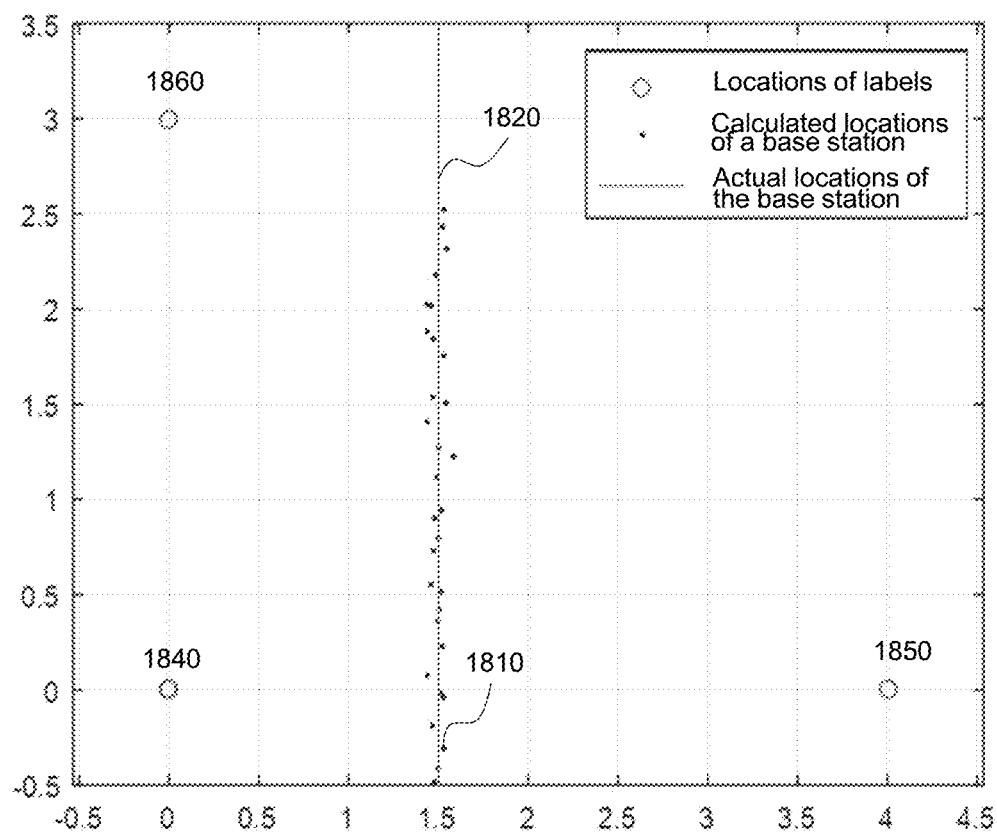
FIG. 18 is a schematic diagram illustrating an exemplary location of the base station determined based on the distances according to some embodiments of the present disclosure.

FIG. 17 is a schematic diagram illustrating exemplary distances between a first label, a second label, a third label, and a base station according to some embodiments of the present disclosure. FIG. 18 is a schematic diagram illustrating exemplary locations of the base station determined based on the distances according to some embodiments of the present disclosure.

As shown in FIG. 18, the horizontal axis and the vertical axis represent the $x_{UWB}$-axis and the $y_{UWB}$-axis based on the UWB coordinate system, respectively. Coordinates of the first label 1840, the second label 1850, and the third label 1860 are (0.0, 0.0), (4.0, 0.0), (0.0, 3.0), respectively. As shown in FIG. 17, the horizontal axis represents time-axis, and the vertical axis represents the distance between a label (e.g., the first label 1840, the second label 1850, the third label 1860) and a base station. Each point in 1710 corresponding to the vertical axis is the distance between the first label and the base station. Each point in 1720 corresponding to the vertical axis is the distance between the second label and the base station. Each point in 1730 corresponding to the vertical axis is the distance between the third label and the base station.

In some embodiments, the location (e.g., a coordinate of each point 1810) of the base station is determined based on distances of the three labels and the base station according to formula (2) above. Points of line 1820 are actual locations of the base station.

Figure 19:
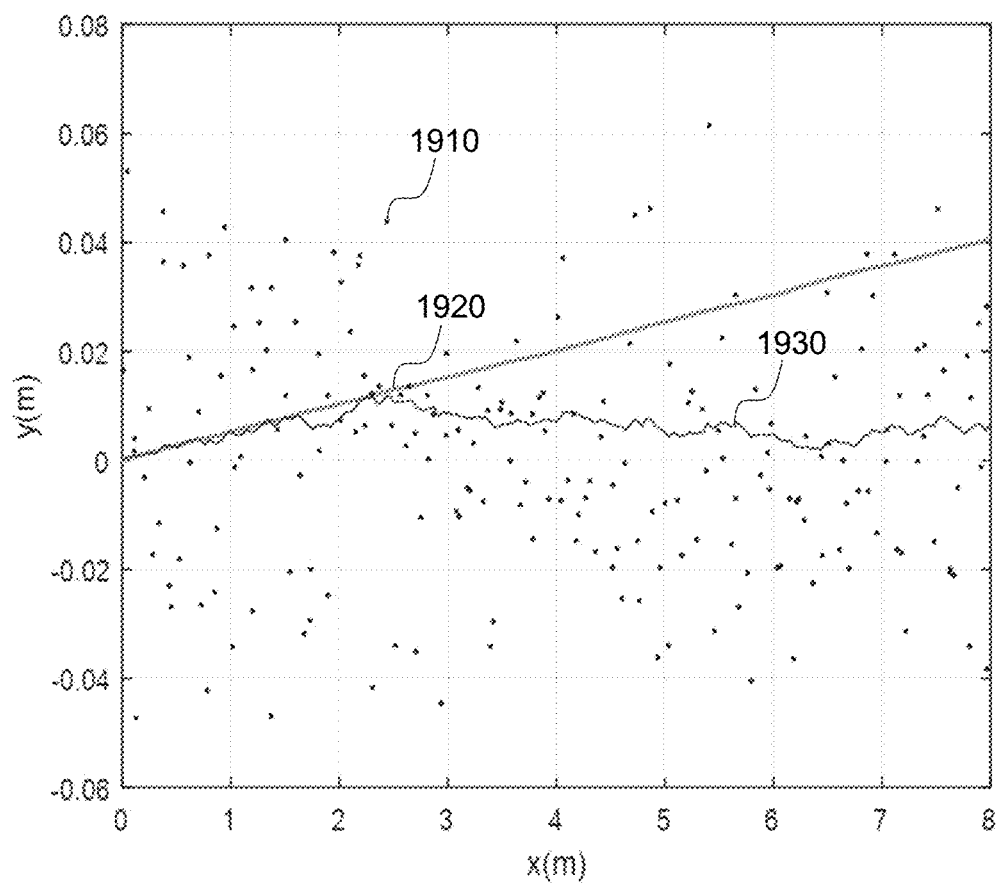
FIG. 19 is a schematic diagram illustrating an exemplary first fusion calculation according to some embodiments of the present disclosure.
Figure 20:
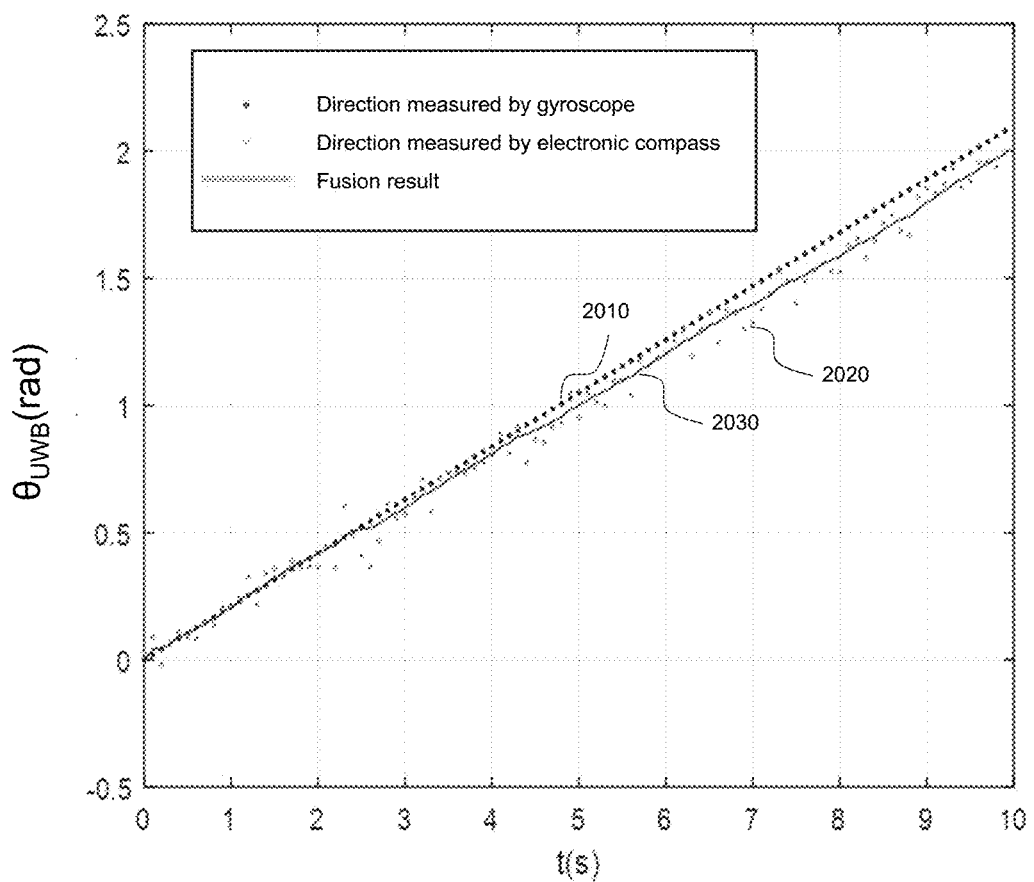
FIG. 20 is a schematic diagram illustrating an exemplary second fusion calculation according to some embodiments of the present disclosure.

FIG. 19 is a schematic diagram illustrating an exemplary first fusion calculation according to some embodiments of the present disclosure. FIG. 20 is a schematic diagram illustrating an exemplary second fusion calculation according to some embodiments of the present disclosure.

In some embodiments, when the device (e.g., the device 110, the device in FIG. 15) moves e.g., in a speed of 0.4 meters per second along with the $x_{UWB}$-axis, the error of a locating result (e.g., the first location information) transmitted by the UWB positioning system is within 0.1 meters. The error of a locating result (e.g., the speed information) transmitted by the rotary encoders is about 5 millimeters per meter. As shown in FIG. 19, the horizontal axis represents the distance that the device was traveled, and the vertical axis represents a locating error. Each point in 1910 corresponding to the y-axis represents a locating error of a first locating result (e.g., the first location information) transmitted by the UWB positioning system, which is within a range from −0.06 to 0.08. Each point on the line 1920 corresponding to the y-axis represents a locating error of a second locating result (e.g., the speed information) transmitted by the rotary encoders. With the movement of the device, an error of the second locating result of the rotary encoders increased. Each point on the curve 1930 corresponding to the y-axis represents an error of a third locating result after performing the first fusion calculation (e.g., the first fusion calculation in 1530) based on the first locating result and the second locating result, which is within a range from −0.02 to 0.02. Thus, a locating error caused by the rotary encoders and/or the UWB positioning system is reduced after performing the first fusion calculation.

In some embodiments, 100 datasets of the device are obtained when the device rotated at 0.2 rads per second. Each of the 100 datasets includes the orientation information (e.g., 2010 in FIG. 20) associated with the device determined by the gyroscope and the orientation information (e.g., 2020 in FIG. 20) associated with the device determined by compass at a time point. The target orientation information (e.g., 2030 in FIG. 20) of the device is determined by performing the second fusion calculation in 1540 based on the 100 datasets. Assume that the angle speed is 0.2 rads per second, when t equals to 5 s or 10 s, the target orientation angle $\theta_{UWB}$ of the device is 1 rad or 2 rads, respectively. As shown in FIG. 20, the curve 2030 is closer to the ideal results compared with the datasets 2010 and the datasets 2020.

Figure 21:
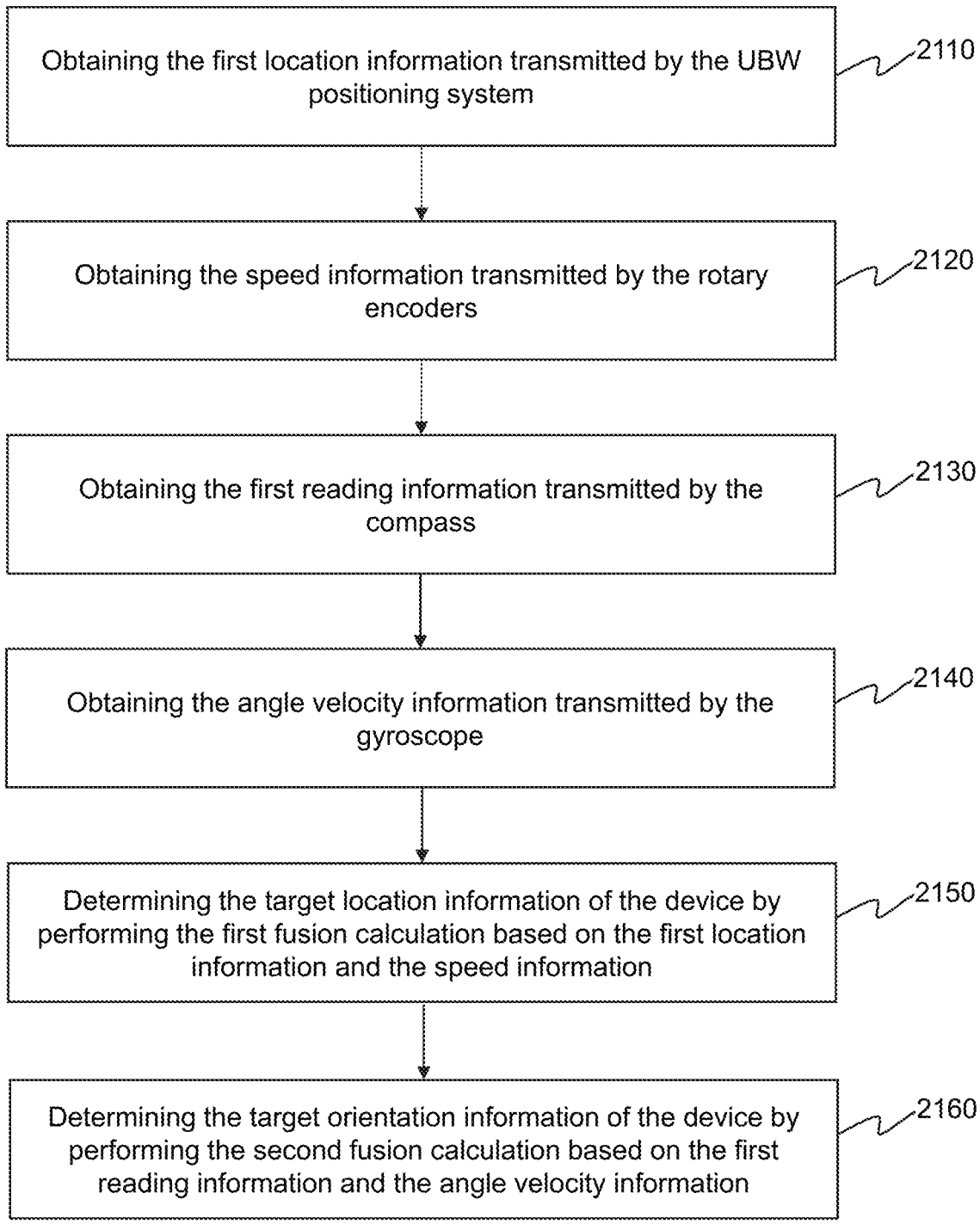
FIG. 21 is a flowchart illustrating an exemplary process for positioning a device according to some embodiments of the present disclosure.

FIG. 21 is a flowchart illustrating an exemplary process for positioning a device according to some embodiments of the present disclosure. In some embodiments, the process 2100 may be implemented as a set of instructions (e.g., an application) stored in the storage ROM 1230 or RAM 1240. The processor 1220 and/or the modules in FIG. 14 may execute the set of instructions, and when executing the instructions, the processor 1220 and/or the modules may be configured to perform the process 2100. The operations of the illustrated process presented below are intended to be illustrative. In some embodiments, the process 2100 may be accomplished with one or more additional operations not described and/or without one or more of the operations herein discussed. Additionally, the order in which the operations of the process illustrated in FIG. 21 and described below is not intended to be limiting.

In 2110, the processing device 122 (e.g., the first obtainment module 1410) obtains the first location information transmitted by the UWB positioning system. In some embodiments, the process for obtaining the first location information in 2110 is the same as or similar to the process for obtaining the first location information in 1510, the descriptions of which may be not repeated here.

In 2120, the processing device 122 (e.g., the first obtainment module 1410) obtains the speed information transmitted by the rotary encoders. In some embodiments, the process for obtaining the speed information in 2120 may be the same as or similar to the process for obtaining the speed information in 1510, the descriptions of which may be not repeated here.

In 2130, the processing device 122 (e.g., the second obtainment module 1420) obtains the first orientation information transmitted by the compass. In some embodiments, the process for obtaining the first orientation information in 2130 may be the same as or similar to the process for obtaining the first orientation information in 1520, the descriptions of which may be not repeated here.

In 2140, the processing device 122 (e.g., the second obtainment module 1420) obtains the angle velocity information transmitted by the gyroscope. In some embodiments, the process for obtaining the angle velocity information in 2140 may be the same as or similar to the process for obtaining the angle velocity information in 1520, the descriptions of which may be not repeated here.

In 2150, the processing device 122 (e.g., the first determination module 1430) determines the target location information of the device by performing the first fusion calculation based on the first location information and the speed information. In some embodiments, the process for determining the target location information in 2150 is the same as or similar to the process for determining the target location information in 1530, the descriptions of which may be not repeated here.

In 2160, the processing device 122 (e.g., the second determination module 1440) determines the target orientation information of the device by performing the second fusion calculation based on the first orientation information and the angle velocity information. In some embodiments, the process for determining the target orientation information in 2160 is the same as or similar to the process for determining the target location information in 1540, the descriptions of which may be not repeated here.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 22:
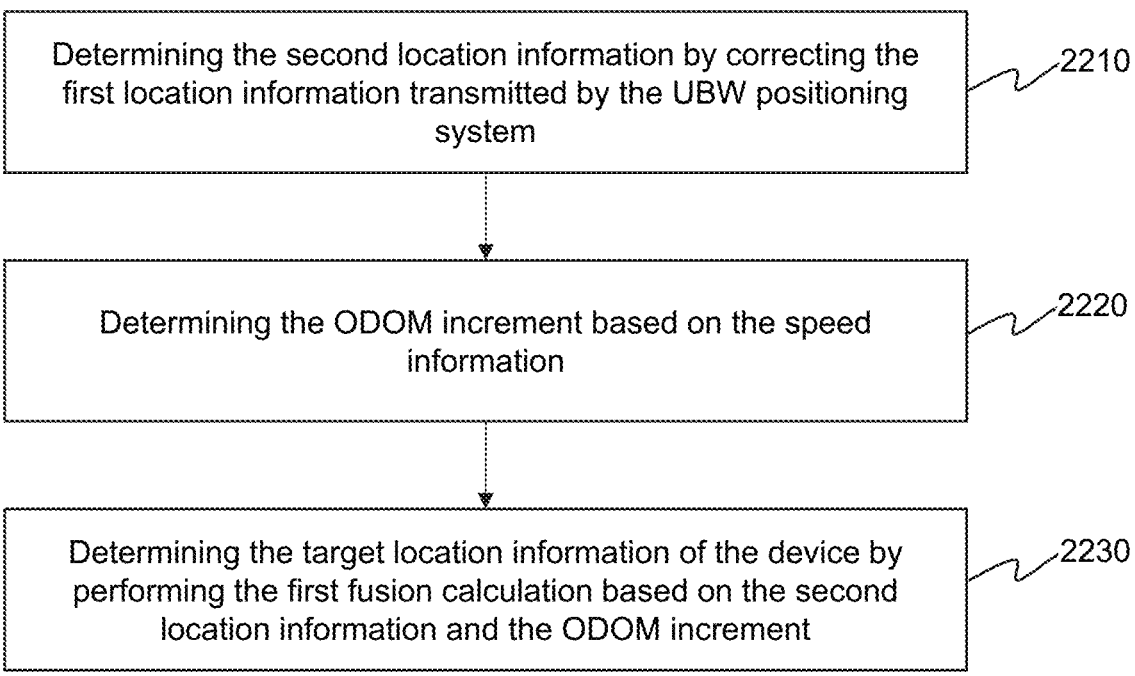
FIG. 22 is a flowchart illustrating an exemplary process for determining target location information of a device according to some embodiments of the present disclosure.

FIG. 22 is a flowchart illustrating an exemplary process for determining target location information of a device according to some embodiments of the present disclosure. In some embodiments, the process 2200 may be implemented as a set of instructions (e.g., an application) stored in the storage ROM 1230 or RAM 1240. The processor 1220 and/or the modules in FIG. 14 may execute the set of instructions, and when executing the instructions, the processor 1220 and/or the modules may be configured to perform the process 2200. The operations of the illustrated process presented below are intended to be illustrative. In some embodiments, the process 2200 may be accomplished with one or more additional operations not described and/or without one or more of the operations herein discussed. Additionally, the order in which the operations of the process illustrated in FIG. 22 and described below is not intended to be limiting.

In 2210, the processing device 122 (e.g., the first determination module 1430) determines the second location information by correcting the first location information transmitted by the UWB positioning system. In some embodiments, the process for determining the second location information in 2210 is the same as or similar to the process for determining the second location information in 1530, the descriptions of which may be not repeated here.

In 2220, the processing device 122 (e.g., the first determination module 1430) determines the ODOM increment based on the speed information. In some embodiments, the process for determining the ODOM increment in 2220 is the same as or similar to the process for determining the ODOM increment in 1530, the descriptions of which may be not repeated here.

In 2230, the processing device 122 (e.g., the first determination module 1430) determines the target location information of the device (e.g., the device 110, the device in FIG. 15) by performing the first fusion calculation based on the second location information and the ODOM increment. In some embodiments, the process for determining the target location information in 2230 is the same as or similar to the process for determining the target location information in 1530, the descriptions of which may be not repeated here.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

According to some embodiments of the present disclosure, a positioning method of a device is provided. The method includes: obtaining the first location information transmitted by the UWB positioning system; obtaining the speed information transmitted by the rotary encoders; obtaining the first orientation information transmitted by the compass; obtaining the angle velocity information transmitted by the gyroscope; determining the target location information of the device (e.g., the device 110, the device in FIG. 15) by performing the first fusion calculation based on the first location information and the speed information; and determining the target orientation information of the device by performing the second fusion calculation based on the first orientation information and the angle velocity information.

In some embodiments, the UWB positioning system includes the base station, the first label, the second label, and the third label. The base station is disposed in the device. At least one of the first label, the second label, or the third label is set in different lines.

In some embodiments, the method includes: determining the second location information by correcting the first location information transmitted by the UWB positioning system; determining the ODOM increment based on the speed information; and determining the target location information of the device by performing the first fusion calculation based on the second location information and the ODOM increment.

In some embodiments, the first location information is corrected according to the formula (3).

In some embodiments, the ODOM increment is determined according to the formulas (4)-(7).

In some embodiments, the target location information is determined according to the formulas (8)-(16).

In some embodiments, the first label, the second label, and the third label in the UWB positioning system are used to construct the UWB coordinate system $x_{UWB}o_{UWB}y_{UWB}$.

In some embodiments, the target orientation information includes the angle between the direction of the head of the device and the $x_{UWB}$-axis of the UWB coordinate system.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python, or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in smaller than all features of a single foregoing disclosed embodiment.

We claim:

1. A method for positioning a device, comprising:
obtaining a location parameter associated with the device, wherein the location parameter includes at least one of first location information or speed information;
obtaining an orientation parameter associated with the device, wherein the orientation parameter includes at least one of first orientation information or angle velocity information;
determining target location information of the device by performing a first fusion calculation based on the location parameter;
wherein the performing the first fusion calculation based on the location parameter includes:
determining second location information based on the first location information;
determining an odometry (ODOM) increment based on the speed information; and
determining the target location information of the device based on the second location information and the ODOM increment;
wherein the first fusion calculation includes:
determining the second location information by correcting the first location information obtained by a UWB positioning system;
determining the ODOM increment based on the speed information; and
determining the target location information of the device by performing the first fusion calculation based on the second location information and the ODOM increment;
wherein the first location information obtained by the UWB positioning system is corrected according to a formula:

$$r_{modify} = (r_{uwb\_raw} - b_{uwb})/k_{uwb}$$

where $r_{modify}$ represents the second location information, $r_{uwb\_raw}$ represents the first location information obtained by the UWB positioning system, $k_{uwb}$ represents a slope of a straight line obtained by performing a straight line fitting of the first location information using technique of least squares, and $b_{uwb}$ represents an intercept obtained by performing the straight line fitting of the first location information using the technique of least squares; and
determining target orientation information of the device by performing a second fusion calculation based on the orientation parameter;
wherein the device is controlled by operating based on inputs from a sensor to move in a specific scenario.

2. The method of claim 1, wherein the determining the second location information based on the first location information includes:
determining the second location information by performing the straight line fitting of the first location information using the technique of least squares.

3. The method of claim 1, the device performing a uniform linear motion from a first time point to a second time point and a non-uniform linear motion from the second time point to a third time point, wherein the determining the target location information and the target orientation information includes:
determining target location information, for the uniform linear motion of the device, by performing the straight line fitting of the first location information or the speed information using the technique of least squares;
determining target orientation information, for the uniform linear motion of the device, by performing a straight line fitting of the first orientation information or the angle velocity information using the technique of least squares; and
determining target location information and target orientation information, for the non-uniform linear motion of the device, based at least on target location information and target orientation information corresponding to the second time point determined by the straight line fitting.

4. The method of claim 1, wherein the performing the second fusion calculation based on the orientation parameter comprising:
determining second orientation information based on the first orientation information; and
determining the target orientation information of the device based on the second orientation information and the angle velocity information.

5. The method of claim 4, wherein the determining the second orientation information based on the first orientation information includes:
obtaining compass data by rotating the device by a circle; and
determining the second orientation information by correcting the first orientation information based on the compass data.

6. The method of claim 1, wherein the first location information is obtained by the UWB positioning system, the UWB positioning system comprising at least one of a base station, a first label, a second label, or a third label.

7. The method of claim 6, wherein the base station is disposed in the device.

8. The method of claim 7, wherein the speed information includes at least one of speeds of a left wheel and a right wheel of the device, a speed of the device, tick values of rotary encoders of two wheels of the device, a tick value of the device by moving one meter, or a distance between the left wheel and the right wheel of the device.

9. The method of claim 7, wherein at least one of the first label, the second label, or the third label is set in different lines.

10. The method of claim 6, wherein the first location information includes a position of the first label in a UWB coordinate system.

11. The method of claim 6, wherein at least one of the first label, the second label, or the third label of the UWB positioning system is used to construct a map coordinate system.

12. The method of claim 1, wherein the ODOM increment is determined based on the speed information according to formulas:

$$d_{device\_odom} = \frac{(n_{tick\_left} + n_{tick\_right})/2}{N_{tick\_1m}}$$

$$\gamma_{device} = \frac{(n_{tick\_right} - n_{tick\_left})/l_{width}}{N_{tick\_1m}}$$

$$x_{device\_odom} = d_{device\_odom} \cos\gamma_{device}$$

$$y_{device\_odom} = d_{device\_odom} \sin\gamma_{device}$$

where $d_{device\_odom}$ represents a distance that was traveled by the device, $n_{tick\_left}$ represents a tick value rotated by a left wheel encoder of the device, $n_{tick\_right}$ represents a tick value rotated by a right wheel encoder of the device, $N_{tick\_1m}$ represents a tick value rotated by the left or right wheel encoder of the device by moving one meter, $l_{width}$ represents a distance between the left wheel and the right wheel of the device, $x_{device\_odom}$ represents an ODOM increment in the $x_{device}$-axis, $y_{device\_odom}$ represents an ODOM increment in the $y_{device}$-axis, and $\gamma_{device}$ represents a rotation angle of the device.

13. The method of claim 1, wherein the target location information of the device is determined by performing the first fusion calculation based on the second location information and the ODOM increment according to formulas:

$$dx_{device\_odom} = dT \times (v_{device\_odom\_x\_i-1} + v_{device\_odom\_x\_i})/2$$

$$dy_{device\_odom} = dT \times (v_{device\_odom\_y\_i-1} + v_{device\_odom\_y\_i})/2$$

$$\begin{bmatrix} dx_{UWB\_odom} \\ dy_{UWB\_odom} \end{bmatrix} = \begin{bmatrix} \cos\varphi & -\sin\varphi \\ \sin\varphi & \cos\varphi \end{bmatrix} \begin{bmatrix} dx_{device\_odom} \\ dy_{device\_odom} \end{bmatrix}$$

$$x_{UWB\_odom\_i} = x_{UWB\_odom\_i-1} + dx_{UWB\_odom}$$

$$y_{UWB\_odom\_i} = y_{UWB\_odom\_i-1} + dy_{UWB\_odom}$$

$$\begin{bmatrix} x_{UWB\_i} \\ y_{UWB\_i} \end{bmatrix} = K_i \times \left( \begin{bmatrix} x_{UWB\_TOF\_i} \\ y_{UWB\_TOF\_i} \end{bmatrix} - \begin{bmatrix} x_{UWB\_odom\_i} \\ y_{UWB\_odom\_i} \end{bmatrix} \right) + \begin{bmatrix} x_{UWB\_i-1} \\ y_{UWB\_i-1} \end{bmatrix}$$

$$K_i = \overline{P}_i/(\overline{P}_i + R)$$
$$\overline{P}_i = P_i + Q$$
$$P_i = (I - K_{i-1})\overline{P}_{i-1}$$

where (i−1) represents a first time point, i represents a second time point, dT represents a time interval of two first fusion calculations, $dx_{device\_odom}$ represents an ODOM increment along with an $x_{device}$-axis during dT, $dy_{device\_odom}$ represent an ODOM increment along with a $y_{device}$-axis during dT, φ represents an angle between an $x_{device}o_{device}y_{device}$ coordinate system and a UWB coordinate system, $dx_{UWB\_odom}$ represents an ODOM increment along with an $x_{UWB}$-axis during dT, $dy_{UWB\_odom}$ represents an ODOM increment along with a $y_{UWB}$-axis during dT, $x_{UWB\_odom\_i}$ represent an ODOM accumulated value along with the $x_{UWB}$-axis at the time point i, $y_{UWB\_odom\_i}$ represents an ODOM accumulated value along with the $y_{UWB}$-axis at the time point i, $$\begin{bmatrix} x_{UWB\_TOF\_i} \\ y_{UWB\_TOF\_i} \end{bmatrix}$$

represents a coordinate provided by the UWB positioning system at the time point i under a UWB coordinate system, $$\begin{bmatrix} x_{UWB\_i} \\ y_{UWB\_i} \end{bmatrix}$$

represents target location information of the device at the time point i under the UWB coordinate system, R represents a variance matrix of noise of the first location information obtained by the UWB positioning system, Q represents a variance matrix of noise of the ODOM increment, I represents a unit matrix, $K_i$ represents a Kalman filter coefficient matrix, P represents a covariance matrix of errors, $\overline{P}$ represents a sum of the covariance matrix of errors at the time point i and the variance matrix of noise of the ODOM increment.

14. The method of claim 13, wherein the target orientation information includes an angle between a direction of a head of the device and the xUWB-axis of the UWB coordinate system.

15. The method of claim 1, wherein the device includes an automatic device configured to sweep snow.

16. The method of claim 1, wherein the device comprising:
a crawler, wherein the crawler is configured to facilitate the device to move in the specific scenario; and
an ultrasonic sensor, wherein the ultrasonic sensor is configured to facilitate the device to avoid obstacles.

17. A system for positioning a device, comprising:
at least one storage device including a set of instructions;
at least one processor in communication with the at least one storage device; wherein when executing the set of instructions, the at least one processor is configured to cause the system to:
obtain a location parameter associated with the device, wherein the location parameter includes at least one of first location information or speed information;
obtain an orientation parameter associated with the device, wherein the orientation parameter includes at least one of first orientation information or angle velocity information;
determine target location information of the device by performing a first fusion calculation based on the location parameter;
wherein the performing the first fusion calculation based on the location parameter includes:
determining second location information based on the first location information;
determining an odometry (ODOM) increment based on the speed information; and
determining the target location information of the device based on the second location information and the ODOM increment;
wherein the first fusion calculation includes:
determining the second location information by correcting the first location information obtained by a UWB positioning system;
determining the ODOM increment based on the speed information; and
determining the target location information of the device by performing the first fusion calculation based on the second location information and the ODOM increment;

wherein the first location information obtained by the UWB positioning system is corrected according to a formula:

$$r_{modify}=(r_{uwb\_raw}-b_{uwb})/k_{uwb}$$

where $r_{modify}$ represents the second location information, $r_{uwb\_raw}$ represents the first location information obtained by the UWB positioning system, $k_{uwb}$ represents a slope of a straight line obtained by performing a straight line fitting of the first location information using a technique of least squares, and $b_{uwb}$ represents an intercept obtained by performing the straight line fitting of the first location information using the technique of least squares; and determine target orientation information of the device by performing a second fusion calculation based on the orientation parameter;

wherein the device is controlled by operating based on inputs from a sensor to move in a specific scenario.

18. The system for positioning the device of claim 17, further comprising:

a crawler, wherein the crawler is configured to facilitate the device to move in the specific scenario; and an ultrasonic sensor, wherein the ultrasonic sensor is configured to facilitate the device to avoid obstacles.

19. A non-transitory computer-readable storage medium, comprising instructions that, when executed by at least one processor, direct the at least processor to perform a method for positioning a device, the method comprising:

obtaining a location parameter associated with the device, wherein the location parameter includes at least one of first location information or speed information;

obtaining an orientation parameter associated with the device, wherein the orientation parameter includes at least one of first orientation information or angle velocity information;

determining target location information of the device by performing a first fusion calculation based on the location parameter;

wherein the performing the first fusion calculation based on the location parameter includes:

determining second location information based on the first location information;

determining an odometry (ODOM) increment based on the speed information; and determining the target location information of the device based on the second location information and the ODOM increment;

wherein the first fusion calculation includes:

determining the second location information by correcting the first location information obtained by a UWB positioning system;

determining the ODOM increment based on the speed information; and determining the target location information of the device by performing the first fusion calculation based on the second location information and the ODOM increment;

wherein the first location information obtained by the UWB positioning system is corrected according to a formula:

$$r_{modify}=(r_{uwb\_raw}-b_{uwb})/k_{uwb}$$

where "modify represents the second location information, $r_{uwb\_raw}$ represents the first location information obtained by the UWB positioning system, $k_{uwb}$ represents a slope of a straight line obtained by performing a straight line fitting of the first location information using a technique of least squares, and $b_{uwb}$ represents an intercept obtained by performing the straight line fitting of the first location information using the technique of least squares; and determining target orientation information of the device by performing a second fusion calculation based on the orientation parameter;

wherein the device is controlled by operating based on inputs from a sensor to move in a specific scenario.

* * * * *